(12) United States Patent
Xiao et al.

(10) Patent No.: US 12,393,096 B2
(45) Date of Patent: Aug. 19, 2025

(54) TENSORIZED INTEGRATED COHERENT ISING MACHINE

(71) Applicant: HEWLETT PACKARD ENTERPRISE DEVELOPMENT LP, Spring, TX (US)

(72) Inventors: Xian Xiao, Santa Barbara, CA (US); Thomas Van Vaerenbergh, Flemish Brabant (BE); Raymond G. Beausoleil, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 111 days.

(21) Appl. No.: 18/328,555

(22) Filed: Jun. 2, 2023

(65) Prior Publication Data

US 2024/0402572 A1    Dec. 5, 2024

(51) Int. Cl.
    *G09F 3/02*     (2006.01)
    *G02F 3/02*     (2006.01)
(52) U.S. Cl.
    CPC ..................... *G02F 3/02* (2013.01)
(58) Field of Classification Search
    CPC .................................................. G02F 3/02
    See application file for complete search history.

(56) References Cited

U.S. PATENT DOCUMENTS 11,348,010 B1    5/2022   Solgi
11,544,214 B2 *  1/2023   Moudgill ............. G06F 9/3013
11,860,666 B2 *  1/2024   Bunandar ............. G06E 1/045
12,181,909 B2 * 12/2024   Yun ..................... G06E 3/008
12,182,696 B2 * 12/2024   Inaba ................... G06N 3/049

(Continued)

FOREIGN PATENT DOCUMENTS

EP          4012623 A1        6/2022
EP          4012624 A1        6/2022
WO    WO-2024118474 A1 *      6/2024

OTHER PUBLICATIONS

Hamerly et al., "Experimental investigation of performance differences between Coherent Ising Machines and a quantum annealer", May 24, 2019, 26 pages.

(Continued)

*Primary Examiner* — Gerald J Sufleta, II
(74) *Attorney, Agent, or Firm* — Sheppard Mullin Richter & Hampton LLP

(57) ABSTRACT

Examples of the present technology provide "tensorized" integrated coherent Ising machines that improve scalability by leveraging a tensorized optical coupling matrix comprising layers of multi-wavelength photonic tensor-train (TT) cores cascaded together via passive optical cross-connects. A multi-wavelength photonic TT core may comprise a Mach Zehnder interferometer (MZI) mesh (i.e., a lattice/array of interconnected MZIs) that modulates the phase and/or amplitude of optical signals. Tensorized integrated CIMs of the present technology can achieve further scalability optimizations by implementing bistable Ising nodes via one or more multi-wavelength Ising node collections. A multi-wavelength Ising node collection may comprise a bistable Ising nodes implemented on a common MZI, where each bistable Ising node of the multi-wavelength Ising node collection is associated with a separate wavelength of light.

20 Claims, 17 Drawing Sheets

(56) References Cited

U.S. PATENT DOCUMENTS

| | | | |
|---|---|---|---|
| 2019/0378011 A1 | 12/2019 | Iwakura et al. | |
| 2020/0050182 A1 | 2/2020 | Cheng et al. | |
| 2020/0272795 A1* | 8/2020 | Kenney | G06J 1/005 |
| 2020/0364599 A1 | 11/2020 | Ma et al. | |
| 2021/0064689 A1 | 3/2021 | Cheng et al. | |
| 2021/0201079 A1 | 7/2021 | Watanabe | |
| 2022/0101527 A1 | 3/2022 | Wang et al. | |
| 2022/0179159 A1* | 6/2022 | Wu | G02B 6/4271 |
| 2022/0198246 A1 | 6/2022 | Hibat Allah et al. | |
| 2023/0236621 A1* | 7/2023 | Peng | G06E 1/00 |
| | | | 359/107 |
| 2024/0427840 A1* | 12/2024 | Parmigiani | G06F 17/16 |

OTHER PUBLICATIONS

Honjo et al., "100,000-spin coherent Ising machine", Sci. Adv., Sep. 29, 2021, 8 pages.

McMahon et al., "Supplementary Materials for A fully-programmable 100-spin coherent Ising machine with all-to-all connections", Oct. 20, 2016, 25 pages.

Tezak et al., "Integrated Coherent Ising Machines Based on Self-Phase Modulation in Microring Resonators", IEEE Journal of Selected Topics in Quantum Electronics, vol. 26, No. 1, Jan./Feb. 2020, pp. 5900115-5900115.

Xiao et al., "Large-Scale and Energy-Efficient Tensorized Optical Neural Networks on III-V-on-Silicon MOSCAP Platform", APL Photonics, 2021, 11 pages.

* cited by examiner

TENSORIZED INTEGRATED COHERENT ISING MACHINE

BACKGROUND

The Ising model has roots in solid-state physics as a model of ferromagnets. The Ising model maps a broad class of combinatorial optimization problems for which no efficient, accurate classical algorithm exists. The Ising model may be described by a Hamiltonian function (H) as follows where $J_{ij}$ are the elements of a coupling matrix between spins $\sigma_i$ and $\sigma_j$.

$$H = -\sum_{k<j} J_{ij}\vec{\sigma_i}\cdot\vec{\sigma_j}(1 \leq i, j \leq N);\qquad\text{Eq. 1}$$

The Ising model can be used to formulate NP-hard combinatorial optimization problems (i.e., problems such as the "traveling salesman" problem where the number of possible solutions increases exponentially with the number of components of a system) with only polynomial overhead. For this reason, machines/apparatuses that can efficiently and effectively solve the Ising model can be very valuable.

BRIEF DESCRIPTION OF THE DRAWINGS

The present disclosure, in accordance with one or more various examples, is described in detail with reference to the following figures. The figures are provided for purposes of illustration only and merely depict examples.

Figure 1:
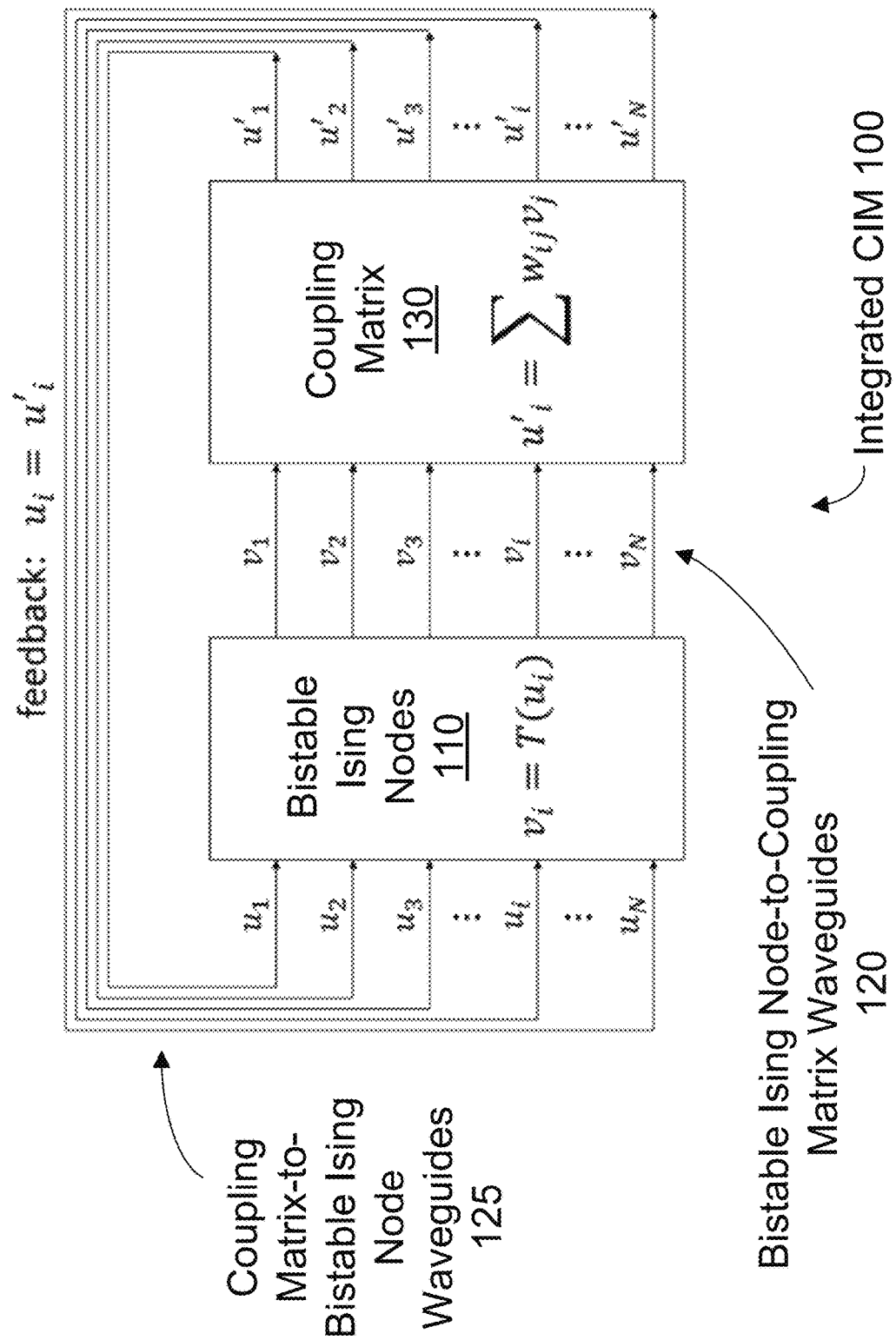
FIG. 1 depicts an example integrated coherent Ising machine (CIM), in accordance with various examples of the presently disclosed technology.

The figures are not exhaustive and do not limit the present disclosure to the precise form disclosed.

DETAILED DESCRIPTION

Ising machines are apparatuses built/designed to find the absolute or approximate ground states of the Ising model. Because NP-hard combinatorial optimization problems (referred to herein as NP-hard problems) can be reformulated using the Ising model, these Ising machines can be used to solve (i.e., find approximate solutions to) NP-hard problems.

Conventional Ising machines generally leverage quantum annealing to find the absolute or approximate ground states of the Ising model based on quantum fluctuations. These conventional Ising machines can be difficult to scale-up due to restrictions in Ising node interconnectivity characteristic of quantum annealing-based systems. Due to scalability limitations, these conventional Ising machines can struggle to solve NP-hard problems of increasing (i.e., higher) complexity without prohibitive footprint and cost increases.

More recently, coherent Ising machines (CIMs) have been introduced that find the absolute or approximate ground states of the Ising model by processing coherent optical signals (e.g., optical signals having the same/similar frequency and waveform). CIMs have the potential for greater scalability than quantum annealing-based Ising machines as they lack the Ising node interconnectivity restrictions characteristic of the quantum annealing-based systems.

Among various CIMs, integrated CIMs (i.e., integrated photonic circuits that implement CIMs) attract much interest due to their high energy efficiency, compact footprint, high speed, and low fabrication cost. For example, PCT/US2015/048952 (which is incorporated herein by reference in its entirety) proposes a CIM architecture comprising: (1) bistable Ising nodes implemented using tunable optical resonators/amplifiers with self-feedback; (2) a coupling matrix; and (3) waveguides connecting the bistable Ising nodes and coupling matrix to form an Ising machine feedback loop.

While an integrated CIM is generally more scalable than conventional/quantum annealing-based Ising machines, further improvements to scalability of the integrated CIM would still be highly desirable.

Against this backdrop, examples of the present technology provide "tensorized" integrated CIMs that improve scalability by leveraging a tensorized optical coupling matrix. The tensorized optical coupling matrix may comprise layers of multi-wavelength photonic tensor-train (TT) cores cascaded together via passive optical cross-connects. A multi-wavelength photonic TT core may comprise a Mach-Zehnder interferometer (MZI) mesh (i.e., a lattice/array of interconnected MZIs) that modulates the phase and/or amplitude of optical signals of multiple wavelengths.

The tensorized optical coupling matrix can implement a tensor-train (TT) decomposition algorithm that efficiently compresses over-parameterized coupling matrices (especially low-rank sparse coupling matrices) used for solving the Ising model. Furthermore, by cascading the multi-wavelength photonic TT cores via passive optical cross-connects, further reductions in hardware (e.g., fewer MZIs) and footprint can be realized. Accordingly, a tensorized integrated CIM of the present technology can be scaled-up to solve complex NP-hard problems with less hardware and a smaller footprint than existing integrated CIMs. Relatedly, the tensorized integrated CIM may be less expensive to fabricate, consume less power, and require less control complexity than existing integrated CIMs.

As described in greater detail below, tensorized integrated CIMs can achieve further scalability optimizations through intelligent/particularized design of bistable Ising nodes. For example, bistable Ising nodes of a tensorized integrated CIM can be implemented via one or more multi-wavelength Ising node collections. A multi-wavelength Ising node collection may comprise a plurality of bistable Ising nodes, where each bistable Ising node of the multi-wavelength Ising node collection is associated with a separate wavelength of light.

A single multi-wavelength Ising node collection-to-tensorized optical coupling matrix waveguide can optically connect an output from the multi-wavelength Ising node collection to an input multi-wavelength photonic TT core of the tensorized optical coupling matrix. Relatedly, a single tensorized optical coupling matrix-to-multi-wavelength Ising node collection waveguide can optically connect an output multi-wavelength photonic TT core of the tensorized optical coupling matrix to an input of the multi-wavelength Ising node collection. Accordingly, the multi-wavelength Ising node collection-to-tensorized optical coupling matrix waveguide and the tensorized optical coupling matrix-to-multi-wavelength Ising node collection waveguide can optically connect the multi-wavelength Ising node collection and the tensorized optical coupling matrix to form an Ising machine feedback loop.

Multi-wavelength Ising node collections can reduce hardware and footprint required to implement a tensorized integrated CIM of the presently disclosed technology. That is, tensorized integrated CIMs that leverage a multi-wavelength Ising node collection architecture can realize greater scalability than potential alternative tensorized integrated CIM designs.

For example, bistable Ising nodes in existing integrated CIMs are not grouped into multi-wavelength Ising node collections. Instead, each bistable Ising node is associated with its own bistable Ising node-to-coupling matrix waveguide, and its own coupling matrix-to-bistable Ising node waveguide. For this reason, implementing a tensorized integrated CIM using this existing bistable Ising node arrangement would generally require a multiplexer to multiplex optical signals received from bistable Ising nodes onto a waveguide associated with an input multi-wavelength photonic TT core of the tensorized optical coupling matrix. Relatedly, a demultiplexer would be required to demultiplex signals received from an output multi-wavelength photonic TT core of the tensorized optical coupling matrix onto waveguides going to the bistable Ising nodes. Depending on the size of the tensorized integrated CIM (e.g., the number of constituent multi-wavelength photonic TT cores per layer), the number and/or size of these multiplexers and demultiplexers may also increase. Also, for a tensorized integrated CIM comprising N bistable Ising nodes, this simplistic bistable Ising node arrangement would require N bistable Ising node-to-multiplexer waveguides and N demultiplexer-to-bistable Ising node waveguides.

However, by leveraging multi-wavelength Ising node collections instead of the simplistic/conventional arrangement of bistable Ising nodes, tensorized integrated CIMs of the presently disclosed technology can: (a) reduce/eliminate the above-described multiplexer(s) and demultiplexer(s); (b) reduce the number of waveguides required to connect the bistable Ising nodes and the tensorized coupling matrix; and (c) improve on-chip arrangement/consolidation of bistable Ising node hardware. Accordingly, tensorized integrated CIMs that implement multi-wavelength Ising node collections can realize greater compactness (i.e., smaller footprints) with less hardware than potential alternative (and more simplistic) tensorized integrated CIM designs. Through these footprint and hardware reductions, larger (and more powerful systems) can be implemented on smaller chips.

Examples of the present technology will be described in greater detail below in conjunction with the following FIGS.

FIG. 1 depicts an example integrated CIM 100. Integrated CIM 100 may represent a generic integrated CIM upon which examples of the presently disclosed technology improve.

As depicted, integrated CIM 100 comprises: (1) bistable Ising nodes 110; (2) a coupling matrix 130; (3) bistable Ising node-to-coupling matrix waveguides 120; and coupling matrix-to-bistable Ising node waveguides 125. Bistable Ising node-to-coupling matrix waveguides 120 and coupling matrix-to-bistable Ising node waveguides 125 connect the bistable Ising nodes 110 to coupling matrix 130 to form an Ising machine feedback loop.

As depicted, each bistable Ising node of bistable Ising nodes 110 can implement a nonlinear input-output relationship $v_i = T(u_i)$ from its input $u_i$ to its output $v_i$. The function T may be a threshold-like function.

As depicted, coupling matrix 130 applies analog weights to outputs of bistable Ising nodes 110. For example, coupling matrix 130 can compute weighted sums of the outputs of bistable Ising nodes 110 in the manner below:

$$u'_i = \sum w_{ij} v_j; \qquad \text{Eq. 2}$$

Here, the outputs from bistable Ising nodes 110 $v_j$ are multiplied by weights $w_{ij}$ to produce signals $u'_i$. Coupling matrix-to-bistable Ising node waveguides 125 connect the i-th output from coupling matrix 130 to the input of the i-th bistable Ising node of bistable Ising nodes 110 (e.g., $u_i = u'_i$) in a recurrent feedback loop.

Through the above-described Ising machine feedback loop, integrated CIM 100 can find the absolute or approximate ground states of the Ising model. Because NP-hard problems can be reformulated using the Ising model, integrated CIM 100 can be used to solve such NP-hard problems.

Figure 2:
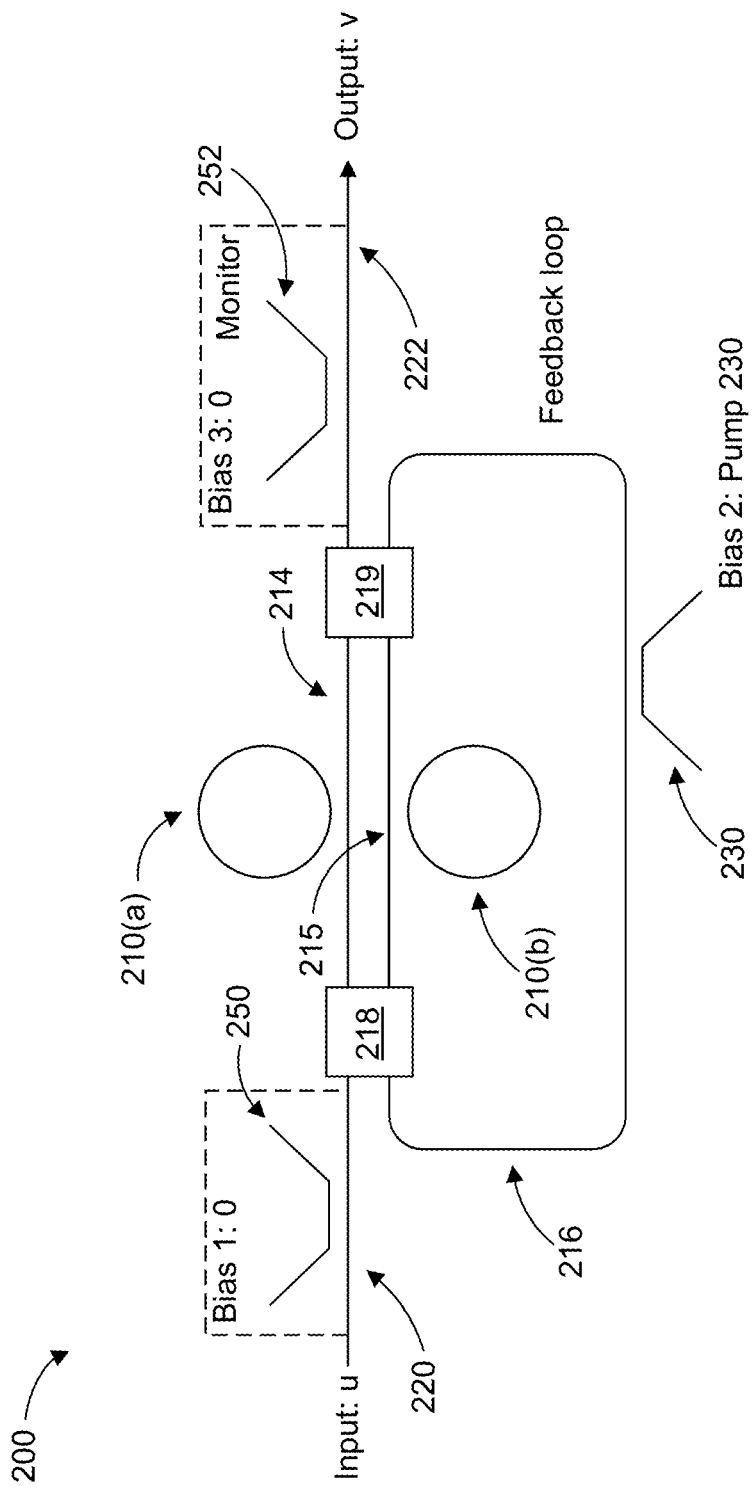
FIG. 2 depicts an example bistable Ising node, in accordance with various examples of the presently disclosed technology.

Before describing hardware implementations for bistable Ising nodes 110 in greater detail in conjunction with FIG. 2, it may be helpful to understand some of the advantages integrated CIM 100 provides over conventional quantum annealing-based Ising machines. For example, integrated CIM 100 includes all-to-all connectivity between bistable Ising nodes 110 and coupling matrix 130. That is, N outputs from bistable Ising nodes 110 are connected to N inputs of coupling matrix 130 via bistable Ising node-to-coupling matrix waveguides 120. Relatedly, N outputs from coupling matrix 130 are connected to N inputs bistable Ising nodes 110 via coupling matrix-to-bistable Ising node waveguides 125. Due to this all-to-all connectivity, integrated CIM 100 can outperform conventional quantum annealing-based Ising machines based on integrated CIM 100's associated higher connectivity and reconfigurability. For instance, the computational capacity of an Ising machine may be determined by the number of Ising nodes, but also by the number of possible connections between Ising nodes, corresponding to the number of independent non-zero weights $w_{ij}$ in Eq. 2. As alluded to above, integrated CIMs such as integrated CIM 100 process coherent optical signals. Consequently, $u_i$, $v_i$, $w_{ij}$, etc. are complex-valued. While traditional applications may only use real-valued $w_{ij}$ weights, integrated CIM 100 can use a phase-sensitive nonlinearity that acts on the real-quadrature of $u_i$. This facilitates processing of the spin variable stored in the specific quadrature of the super-mode of the anti-correlated internal states of the two resonators 210(a) and 210(b).

FIG. 2 depicts an example bistable Ising node 200. Bistable Ising node 200 may represent a bistable Ising node which is not implemented in a multi-wavelength bistable Ising node collection. Bistable Ising node 200 may be an example of a bistable Ising node of bistable Ising nodes 110 from FIG. 1.

As depicted, bistable Ising node 200 comprises two optical resonators (i.e., optical resonators 210($a$) and 210($b$)) implemented on the arms of a Mach-Zehnder interferometer (MZI) (i.e., first arm waveguide 214 and second arm waveguide 215). In some examples, optical resonators 210($a$) and 210($b$) may comprise identical optical ring resonators with dispersive optical non-linearity.

The MZI on which optical resonators 210($a$) and 210($b$) are implemented includes: (a) a first arm waveguide 214; (b) a second arm waveguide 215; (c) an input-side optical coupler 218; and (d) an output-side optical coupler 219. As depicted, input-side optical coupler 218 receives a first input from a coupling matrix-to-bistable Ising node waveguide 220 and a second input from a feedback loop waveguide 216. Input-side optical coupler 218 then outputs a first output to first arm waveguide 214 and a second output to second arm waveguide 215. Output-side optical coupler 219 receives a first input from first arm waveguide 214 and a second input from second arm waveguide 215. Output-side optical coupler 219 then outputs a first output to a bistable Ising node-to-coupling matrix waveguide 222 and a second output to feedback loop waveguide 216. Input-side optical coupler 218 and output-side optical coupler 219 may be various types of optical couplers, including 50-50 splitters, multi-mode interferometers (MMIs), direction couplers, etc.

As depicted, bistable Ising node 200 also comprises a feedback loop waveguide 216 and a bias pump 230. An output of bias pump 230 may be optically coupled to feedback loop waveguide 216. As will be described in greater detail below, bias pump 230 and optical resonators 210($a$) and 210($b$) can be configured to store two anti-correlated states associated with bistable Ising node 200. That is, through its feedback loop and MZI structure, bistable Ising node 200 can selectively modify the circulating power of symmetric super-modes of optical resonators 210($a$) and 210($b$) such that optical resonators 210($a$) and 210($b$) assume two anti-correlated states.

In various examples, bistable Ising node 200 may also include bias field couplers 250 and 252. Bias field couplers 250 and 252 can inject bias fields for the spin variable (e.g., one of the four non-relativistic coordinates of an electron) and facilitate monitoring of current spin amplitude.

As examples of the presently disclosed technology are designed in appreciation of, asymmetry of the bistability of a single optical resonator can be circumvented by encoding spin states in two optical resonators (e.g., optical resonators 210($a$) and 210($b$)) configured such that their internal states are anti-correlated. Accordingly, bistable Ising node 220 can exhibit a pitchfork bifurcation as drive from bias pump 230 increases power for a bias field above a threshold level (the phase of the bias field may be weakly related to the length of feedback loop waveguide 216). This may be analogous to the bifurcation occurring in a degenerate optical parametric oscillator (DOPO). In this sense, bistable Ising node 200 can emulate certain traditional CIMs based on DOPOs but with an additional advantage that the input field of bias pump 230 is of the same wavelength as the signal field of bias pump 230. Furthermore, bistable Ising node 200 does not depend on any specific type of optical non-linearity and could also be adaptive to devices with non-linear loss.

As alluded to above, a strong bias field entering a first MZI input (e.g., a first input of input-side optical coupler 218) can lead to tunable, phase-sensitive gain for the transmission of a small signal from a second MZI input (e.g., a second input of input-side optical coupler 218) to an MZI output (e.g., an output from input-side optical coupler 218). A maximum gain can be determined by detuning bias (and signal) drive from a common optical resonator resonance frequency. There may exist a threshold detuning beyond which optical resonators 210($a$) and 210($b$) individually become bistable over a certain input power range. To implement two states to encode spin, coherent feedback can be used to couple resonator modes for optical resonators 210($a$) and 210($b$). For example, using an appropriately chosen bias feedback phase, two metastable states can be made unstable such that optical resonators 210($a$) and 210($b$) can only assume anti-correlated internal states.

As alluded to above, bistable Ising node 200 may be considered a tunable amplifier with feedback (TAFB) that features a pitchfork bifurcation at a particular threshold bias field power. Above this threshold bias field power, the above-mentioned anti-correlated states may exist. Amplitude of bias pump 230 can be used as a parameter to drive bias field power to and/or through the threshold bias field power. The spin variable may be encoded in a specific quadrature that is a function of pump amplitude.

Figure 3A:
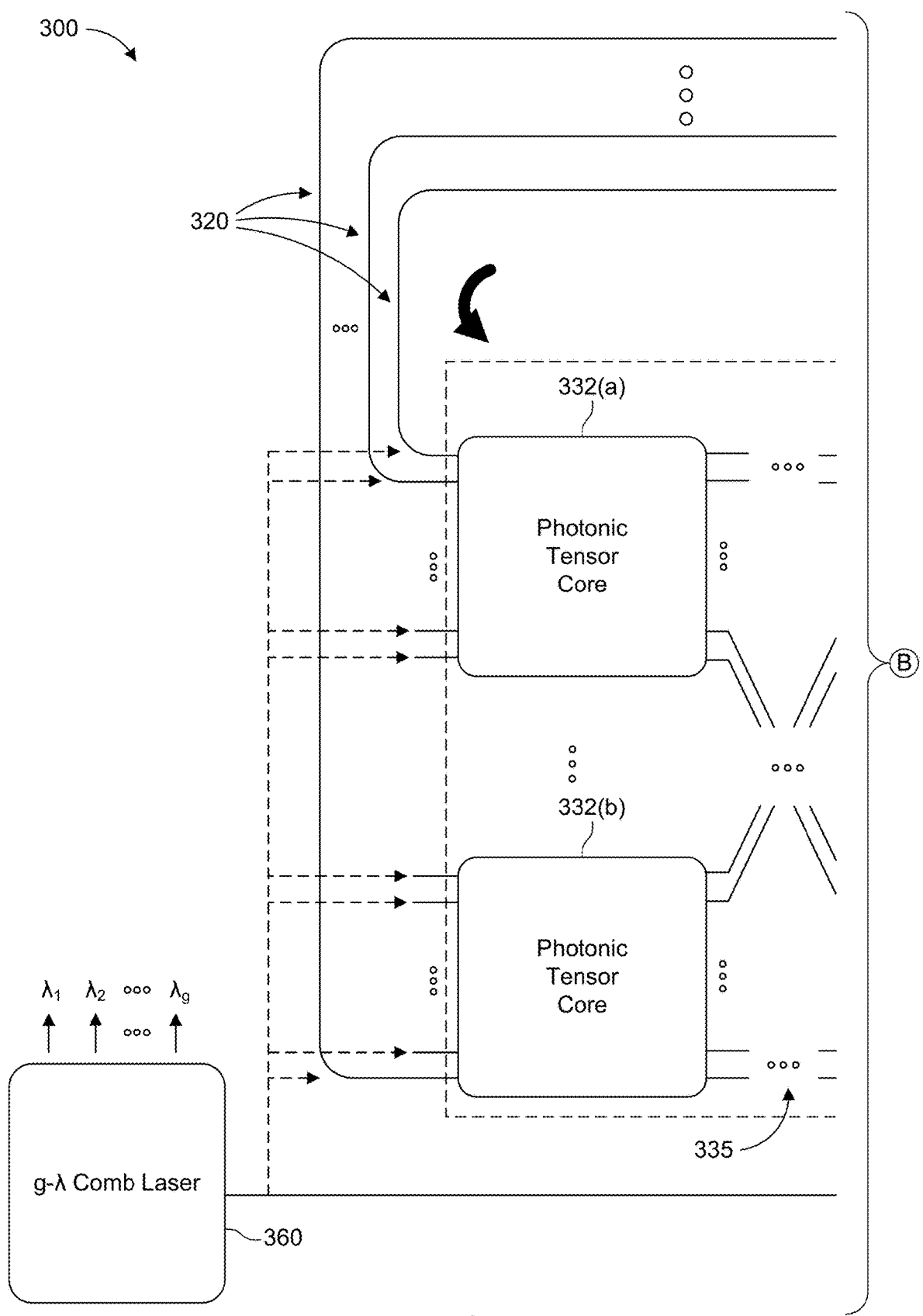
FIGS. 3A-3C depict an example tensorized integrated CIM, in accordance with various examples of the presently disclosed technology.
Figure 3B:
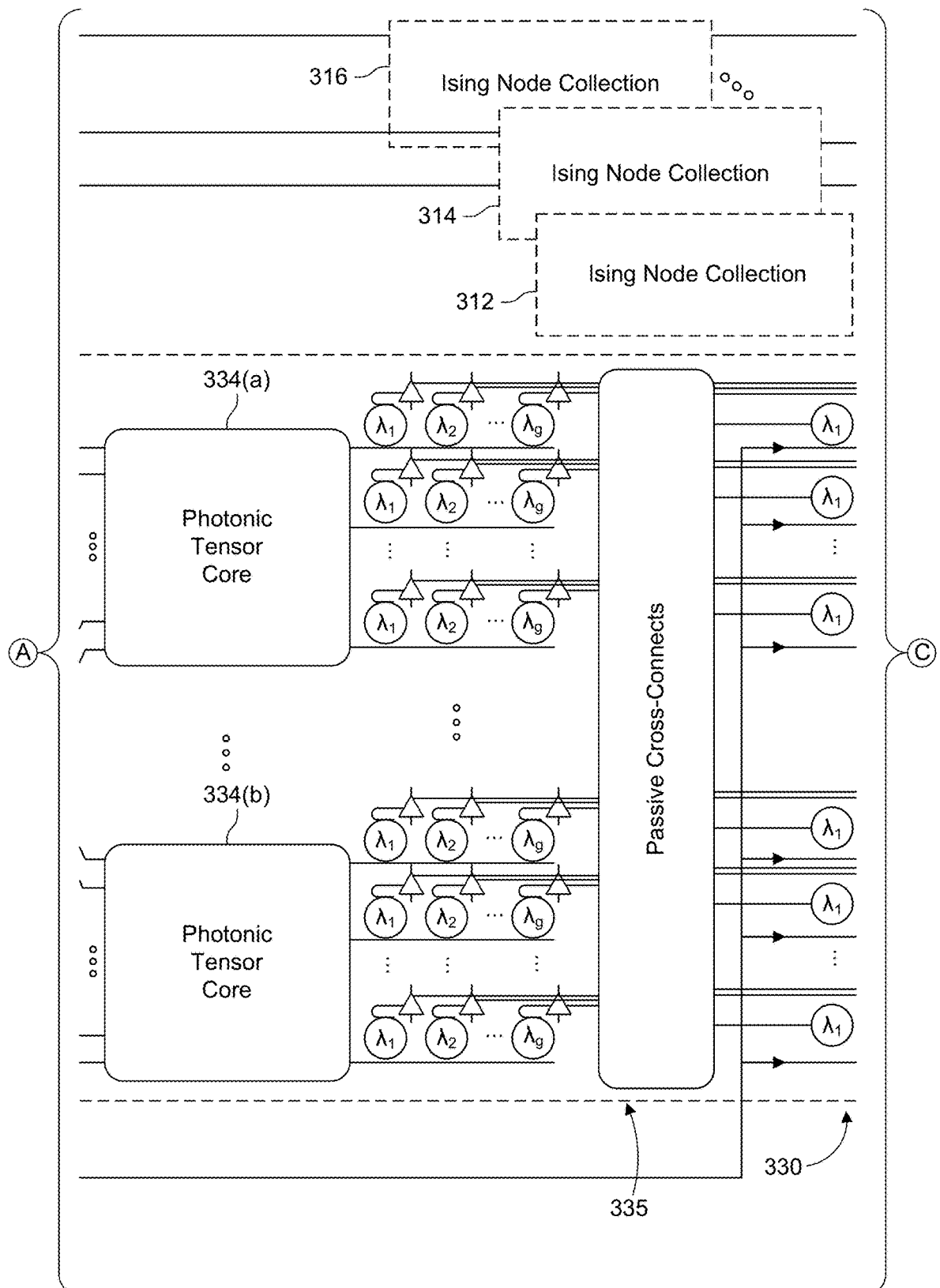
Figure 3C:
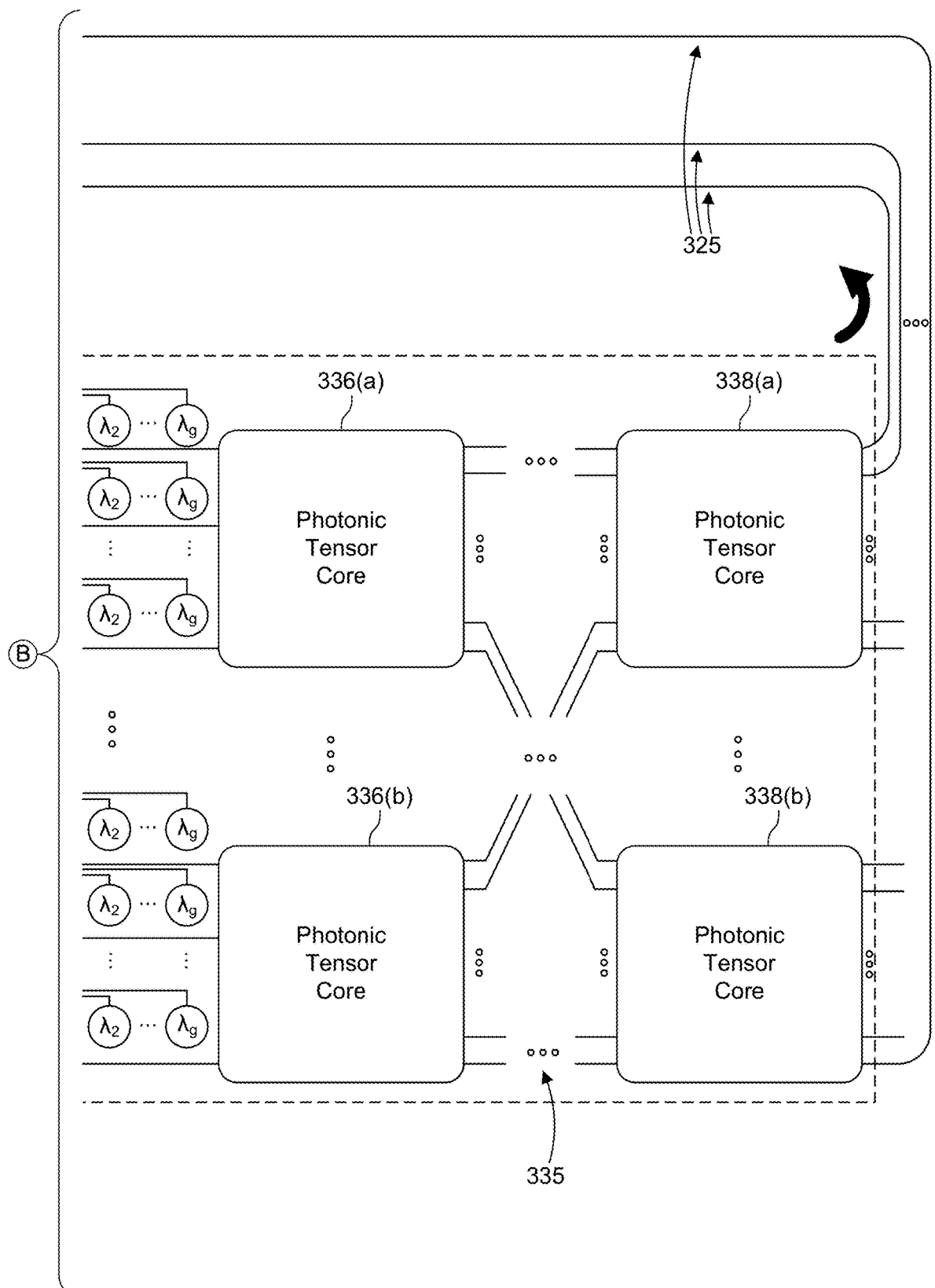
Figure 4A:
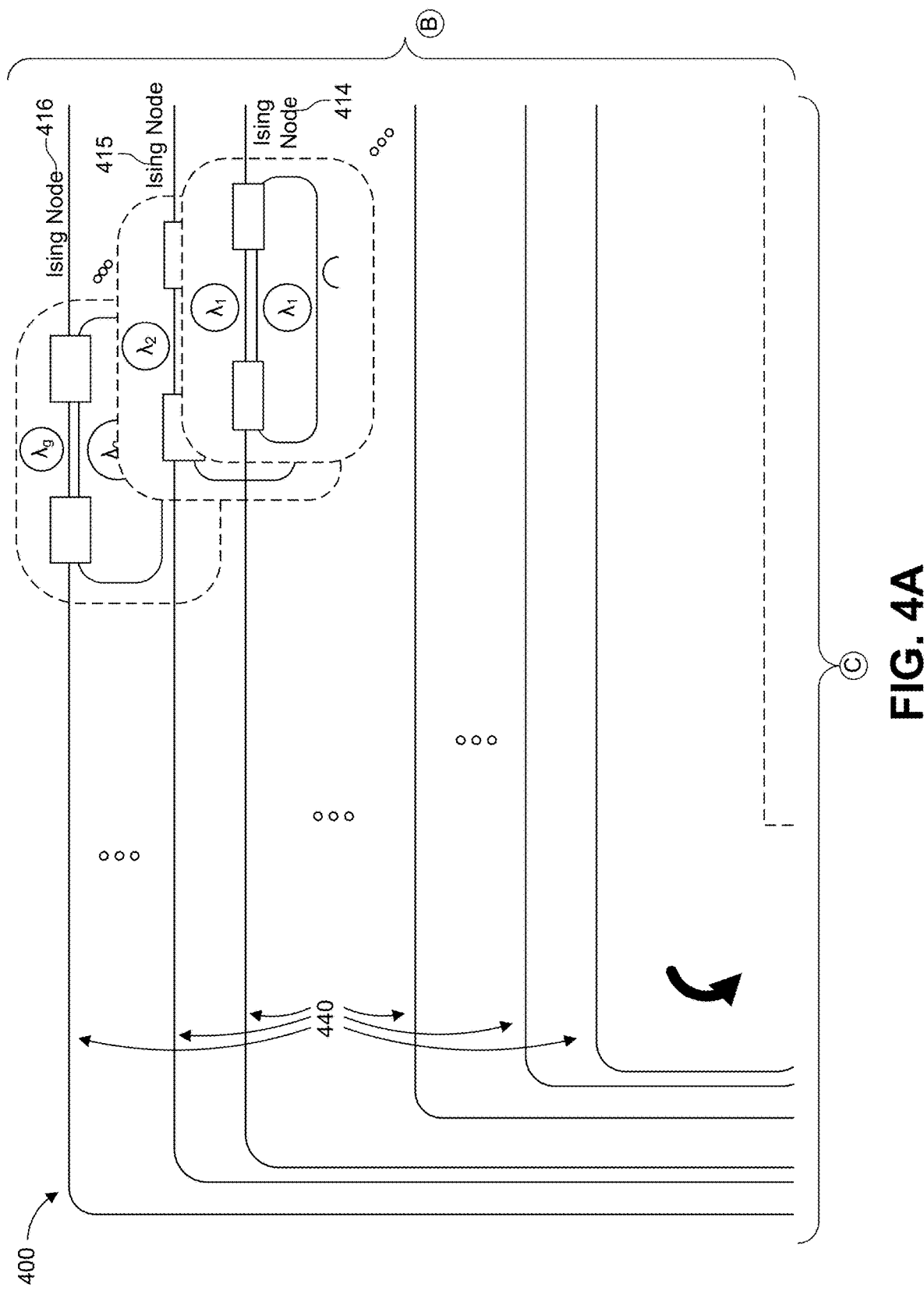
FIGS. 4A-4D depict another example tensorized integrated CIM, in accordance with various examples of the presently disclosed technology.
Figure 4B:
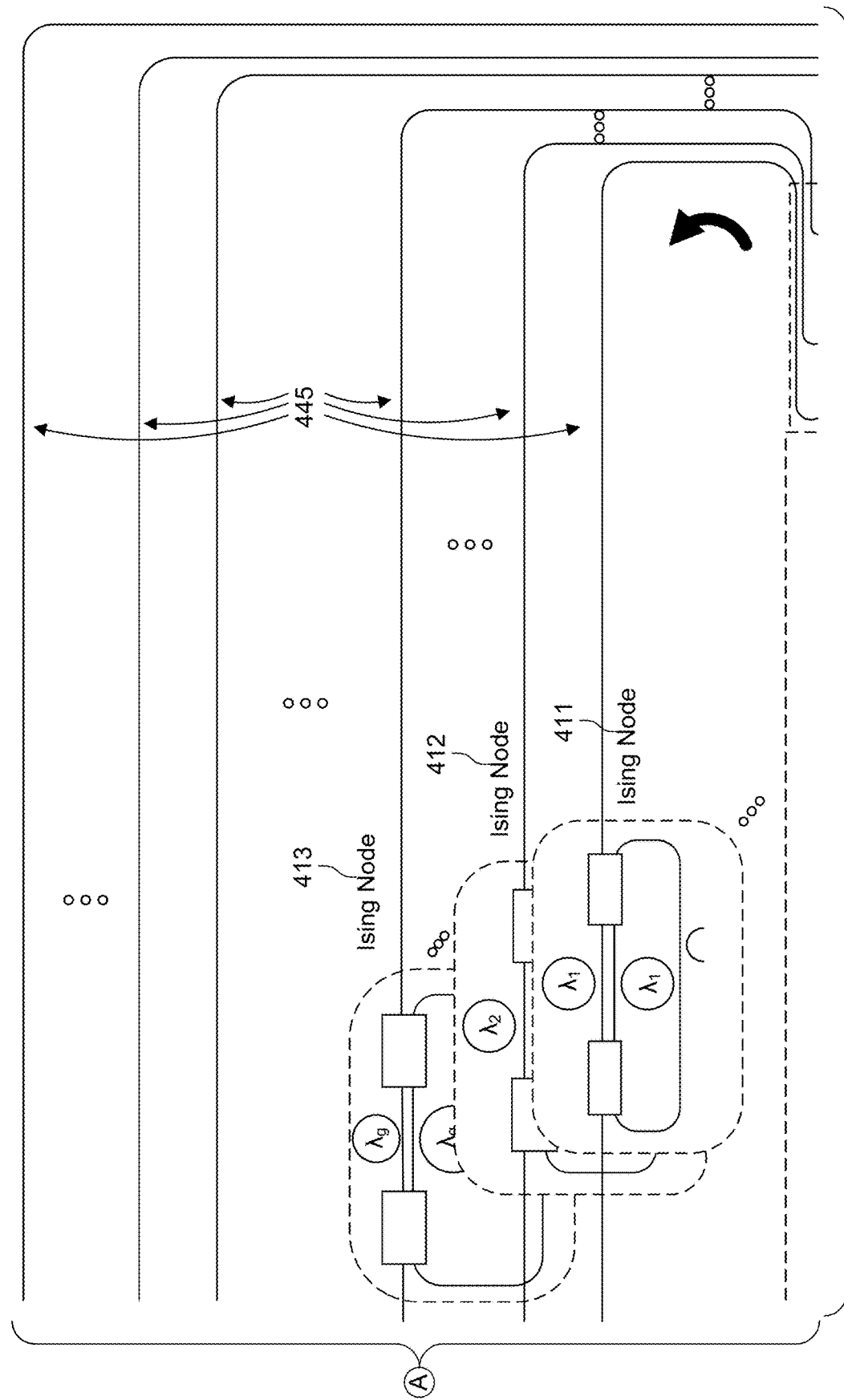
Figure 4C:
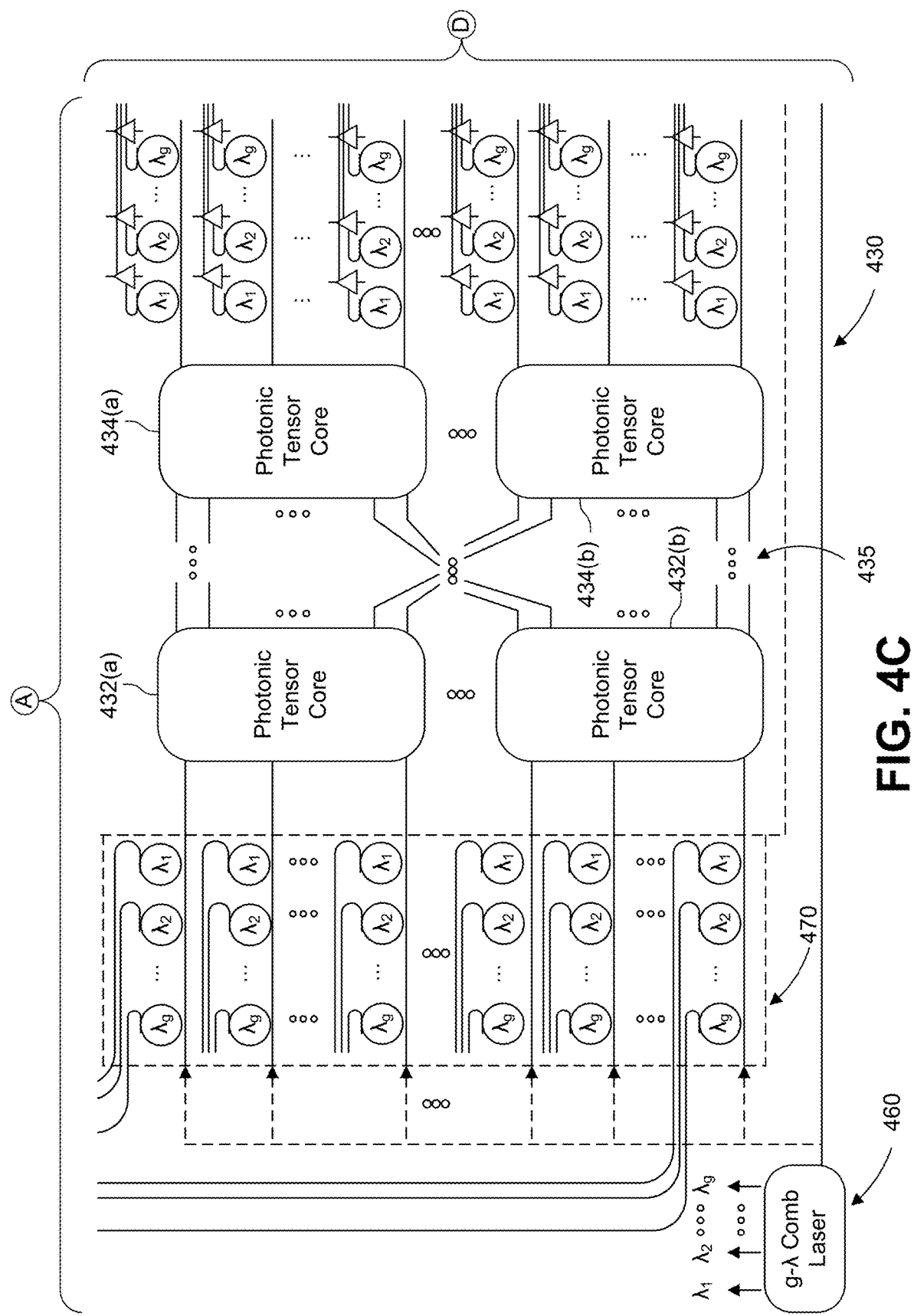
Figure 4D:
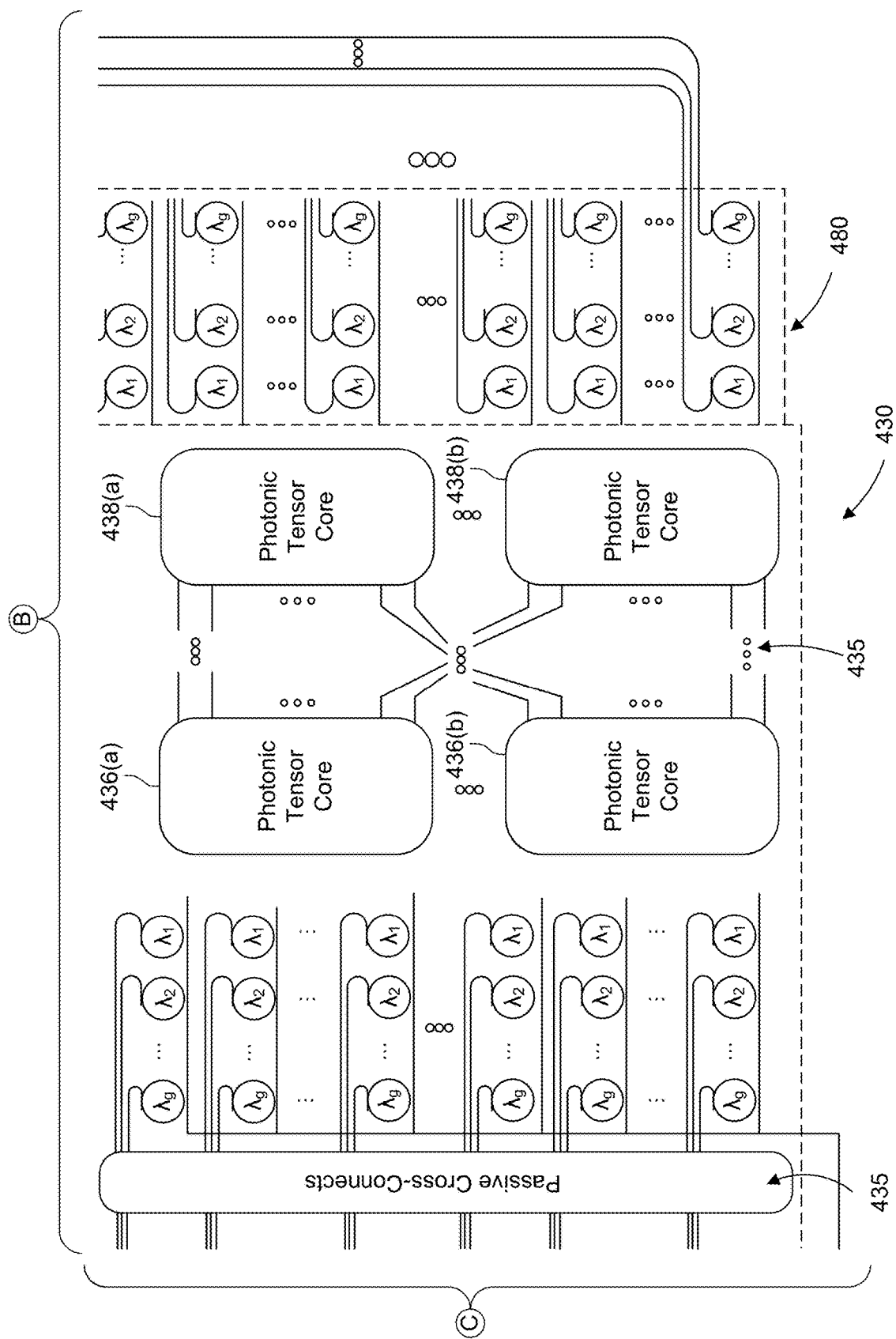

FIGS. 3A-3C depict an example tensorized integrated CIM 300, in accordance with various examples of the present technology.

As depicted, tensorized integrated CIM 300 comprises: (a) multi-wavelength Ising node collections (e.g., multi-wavelength Ising node collections 312, 314, and 316); (b) a tensorized optical coupling matrix 330; (c) multi-wavelength Ising node collection-to-tensorized optical coupling matrix waveguides 320 optically connecting outputs from the multi-wavelength Ising node collections to inputs of tensorized optical coupling matrix 330; and (d) tensorized optical coupling matrix-to-multi-wavelength Ising node collection waveguides 325 optically connecting outputs from tensorized optical coupling matrix 330 to inputs of the multi-wavelength Ising node collections. Accordingly, multi-wavelength Ising node collection-to-tensorized optical coupling matrix waveguides 320 and tensorized optical coupling matrix-to-multi-wavelength Ising node collection waveguides 325 optically connect the multi-wavelength Ising node collections and tensorized optical coupling matrix 330 to form an Ising machine feedback loop. As depicted, tensorized integrated CIM 300 may also include a laser 360 (e.g., a comb laser) that introduces up to g wavelengths of light into tensorized integrated CIM 300.

Example multi-wavelength Ising node collections of the present technology will be described in greater detail in conjunction with FIG. 5. Similarly, an example tensorized optical coupling matrix will be described in greater detail in conjunction with FIGS. 6A-6D. Notwithstanding, it may be useful to describe the composition and operation of tensorized integrated CIM 300 at a high level before proceeding to those figures.

As alluded to above, examples of the present technology provide "tensorized" integrated CIMs (e.g., tensorized integrated CIM 300) that improve scalability by leveraging a tensorized optical coupling matrix (e.g., tensorized optical coupling matrix 330) comprising layers of multi-wavelength photonic tensor-train (TT) cores (e.g., a first layer comprising multi-wavelength photonic TT cores 332($a$) and 332($b$), a second layer comprising multi-wavelength photonic TT cores 334($a$) and 334($b$), a third layer comprising multi-wavelength photonic TT cores 336(a) and 336(b), a fourth layer comprising multi-wavelength photonic TT cores 338(a) and 338(b), etc.) cascaded together via passive optical cross-connects (e.g., passive optical cross-connects 335). A multi-wavelength photonic TT core (e.g., multi-wavelength photonic TT core 332(a)) may comprise a Mach Zehnder interferometer (MZI) mesh (i.e., a lattice/array of interconnected MZIs-see e.g., FIG. 7 for more details) that modulates the phase and/or amplitude of optical signals.

The tensorized optical coupling matrix/cascaded multi-wavelength photonic TT cores can implement a tensor-train (TT) decomposition algorithm that efficiently compresses over-parameterized coupling matrices (especially low-rank sparse coupling matrices) used for solving the Ising model. Furthermore, by cascading the multi-wavelength photonic TT cores via the passive cross-connects, further reductions in hardware (e.g., fewer MZIs) and footprint can be realized. Accordingly, a tensorized integrated CIM of the present technology (e.g., tensorized integrated CIM 300) can be scaled-up to solve complex NP-hard problems with less hardware and a smaller footprint than existing integrated CIMs. Relatedly, the tensorized integrated CIM may be less expensive to fabricate, consume less power, and require less control complexity than existing integrated CIMs.

As alluded to above, tensorized integrated CIMs can achieve further scalability optimizations through intelligent/particularized design of bistable Ising nodes. For example, bistable Ising nodes of a tensorized integrated CIM can be implemented via one or more multi-wavelength Ising node collections (e.g., multi-wavelength Ising node collections 312, 314, 316, etc.). A multi-wavelength Ising node collection (e.g., multi-wavelength Ising node collections 312) may comprise multiple bistable Ising nodes, where each bistable Ising node of the multi-wavelength Ising node collection is associated with a separate wavelength of light (see e.g., FIG. 5 for more details). A single multi-wavelength Ising node collection-to-tensorized optical coupling matrix waveguide (see e.g., an individual multi-wavelength Ising node collection-to-tensorized optical coupling matrix waveguide of the multi-wavelength Ising node collection-to-tensorized optical coupling matrix waveguides 320) can optically connect output from the multi-wavelength Ising node collection to an input multi-wavelength photonic TT core (e.g., multi-wavelength photonic TT core 332(a)) of the tensorized optical coupling matrix. Relatedly, a single tensorized optical coupling matrix-to-multi-wavelength Ising node collection waveguide (see e.g., an individual tensorized optical coupling matrix-to-multi-wavelength Ising node collection waveguide of the tensorized optical coupling matrix-to-multi-wavelength Ising node collection waveguides 325) can optically connect an output multi-wavelength photonic TT core (e.g., multi-wavelength photonic TT core 338(a)) of the tensorized optical coupling matrix to an input of the multi-wavelength Ising node collection. Accordingly, the multi-wavelength Ising node collection-to-tensorized optical coupling matrix waveguide and the tensorized optical coupling matrix-to-multi-wavelength Ising node collection waveguide can optically connect the multi-wavelength Ising node collection and the tensorized optical coupling matrix to form an Ising machine feedback loop.

As alluded to above, multi-wavelength Ising node collections can reduce hardware and footprint required to implement a tensorized integrated CIM of the presently disclosed technology. That is, tensorized integrated CIMs that leverage a multi-wavelength Ising node collection architecture can realize greater scalability than potential alternative tensorized integrated CIM designs.

For illustration, FIGS. 4A-4D depict an example alternative tensorized integrated CIM 400 that does not leverage multi-wavelength Ising node collections.

As depicted, tensorized integrated CIM 400 comprises: (a) bistable Ising nodes (e.g., bistable Ising nodes 411-416), where each bistable Ising node of the bistable Ising nodes is associated with a separate wavelength of light; (b) a tensorized optical coupling matrix 430 comprising layers of multi-wavelength photonic tensor-train (TT) cores (e.g., a first layer comprising multi-wavelength photonic TT cores 432(a) and 432(b), a second layer comprising multi-wavelength photonic TT cores 434(a) and 434(b), a third layer comprising multi-wavelength photonic TT cores 436(a) and 436(b), a fourth layer comprising multi-wavelength photonic TT cores 438(a) and 438(b), etc.) cascaded together via passive optical cross-connects (e.g., passive optical cross-connects 435); (c) a multiplexer 470 that multiplexes optical signals received from bistable Ising node-to-multiplexer waveguides 440 onto input waveguides of tensorized coupling matrix 430; (d) a demultiplexer 480 that demultiplexes signals received from output waveguides of tensorized coupling matrix 430 onto demultiplexer-to-bistable Ising node waveguides 445; (e) bistable Ising node-to-multiplexer waveguides 440 optically connecting outputs from the bistable Ising nodes (e.g., outputs from bistable Ising nodes 411-416) to multiplexer 470; and (f) demultiplexer-to-bistable Ising node waveguides 445 optically connecting outputs from demultiplexer 480 to the bistable Ising nodes. As depicted, each bistable Ising node of tensorized integrated CIM 400 may be implemented on its own MZI, and have its own separate bistable Ising node-to-multiplexer waveguide and demultiplexer-to-bistable Ising node waveguide. Accordingly, each bistable Ising node of tensorized integrated CIM 400 may be implemented in a similar manner to bistable Ising node 200 of FIG. 2.

As depicted, tensorized integrated CIM 400 includes some of the same/similar features as tensorized integrated CIM 300 (e.g., a tensorized optical coupling matrix 430 that contains the same/similar structures as tensorized optical coupling matrix 330, a laser 460 that introduces up to g wavelengths into the system, etc.)—with a few key differences. For example, lacking the multi-wavelength Ising node collection architecture of tensorized integrated CIM 300, tensorized integrated CIM 400 includes a larger number of waveguides between its Ising nodes and its tensorized coupling matrix. For instance, if both tensorized integrated CIM 300 and tensorized integrated CIM 400 comprise N Ising nodes, and each multi-wavelength Ising node collection of tensorized integrated CIM 300 includes g Ising nodes, tensorized integrated CIM 400 may include 2 g times more waveguides between its Ising nodes and tensorized optical coupling matrix. Lacking the multi-wavelength Ising node collection architecture of tensorized integrated CIM 300, tensorized integrated CIM 400 also includes multiplexer 470 (which may comprise one or more individual multiplexers) and demultiplexer 480 (which may comprise one or more individual demultiplexers).

As alluded to above, bistable Ising nodes in existing integrated CIMs are not grouped into multi-wavelength Ising node collections. Instead, each bistable Ising node is associated with its own MZI, its own bistable Ising node-to-coupling matrix waveguide, and its own coupling matrix-to-bistable Ising node waveguide (see e.g., bistable Ising node 200 of FIG. 2). For this reason, implementing a tensorized integrated CIM using this existing bistable Ising node arrangement—of which tensorized integrated CIM 400 is an example—would generally require a multiplexer to multiplex optical signals received from the bistable Ising nodes onto waveguides associated with input multi-wavelength photonic TT cores of the tensorized optical coupling matrix. Relatedly, a demultiplexer would be required to demultiplex signals received from output multi-wavelength photonic TT cores of the tensorized optical coupling matrix onto waveguides going to the bistable Ising nodes. Depending on the size of the tensorized integrated CIM (e.g., the number of constituent multi-wavelength photonic TT cores per layer), the number and/or size of these multiplexers and demultiplexers may also increase. Also (and as alluded to above), the tensorized integrated CIM implementing this simple/existing bistable Ising node arrangement (e.g., tensorized integrated CIM 400) may require many more waveguides between bistable Ising nodes and tensorized optical coupling matrix than a tensorized integrated CIM (e.g., tensorized integrated CIM 300) that leverages multi-wavelength Ising node collections.

Accordingly, by leveraging multi-wavelength Ising node collections instead of the simplistic/conventional arrangement of bistable Ising nodes, tensorized integrated CIMs of the presently disclosed technology (e.g., tensorized integrated CIM 300) can: (a) reduce/eliminate the above-described multiplexer(s) and demultiplexer(s); (b) reduce the number of waveguides required to connect the bistable Ising nodes and the tensorized coupling matrix; and (c) improve on-chip arrangement/consolidation of bistable Ising node hardware. Accordingly, tensorized integrated CIMs that implement multi-wavelength Ising node collections can realize greater compactness (i.e., smaller footprints) with less hardware than potential alternative (and more simplistic) tensorized integrated CIM designs. Through these footprint and hardware reductions, larger (and more powerful systems) can be implemented on smaller chips.

Figure 5:
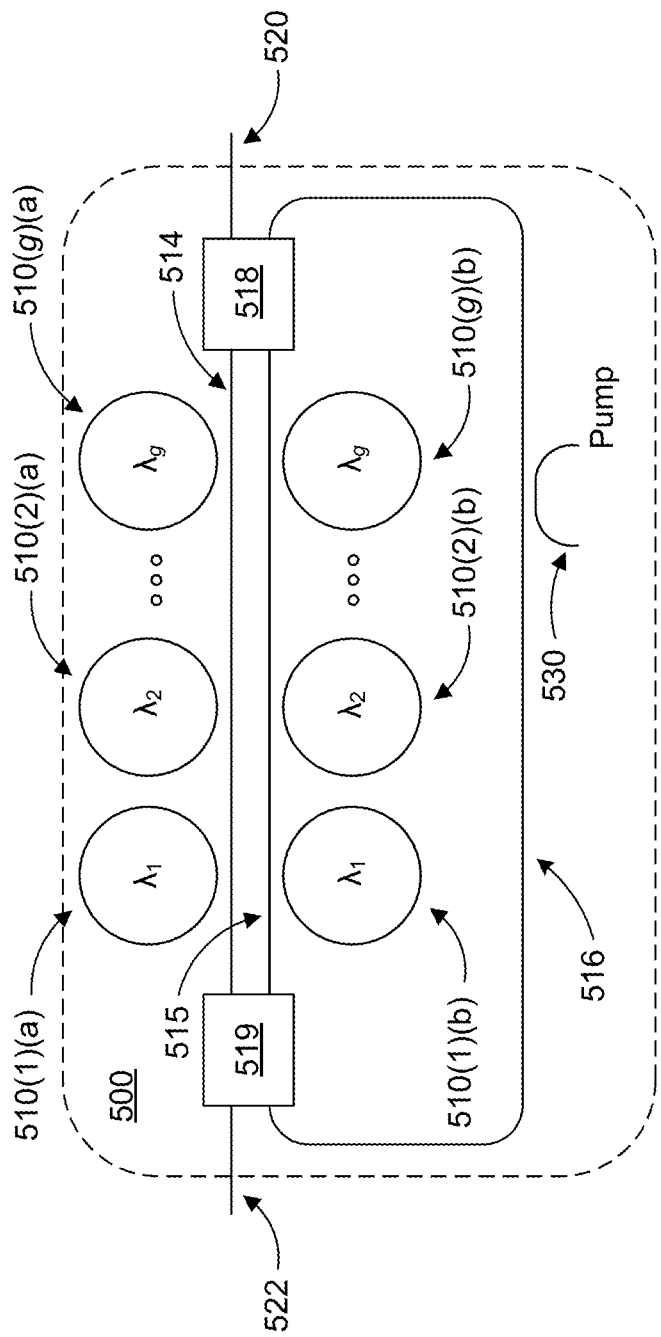
FIG. 5 depicts an example multi-wavelength Ising node collection, in accordance with various examples of the presently disclosed technology.
Figure 6A:
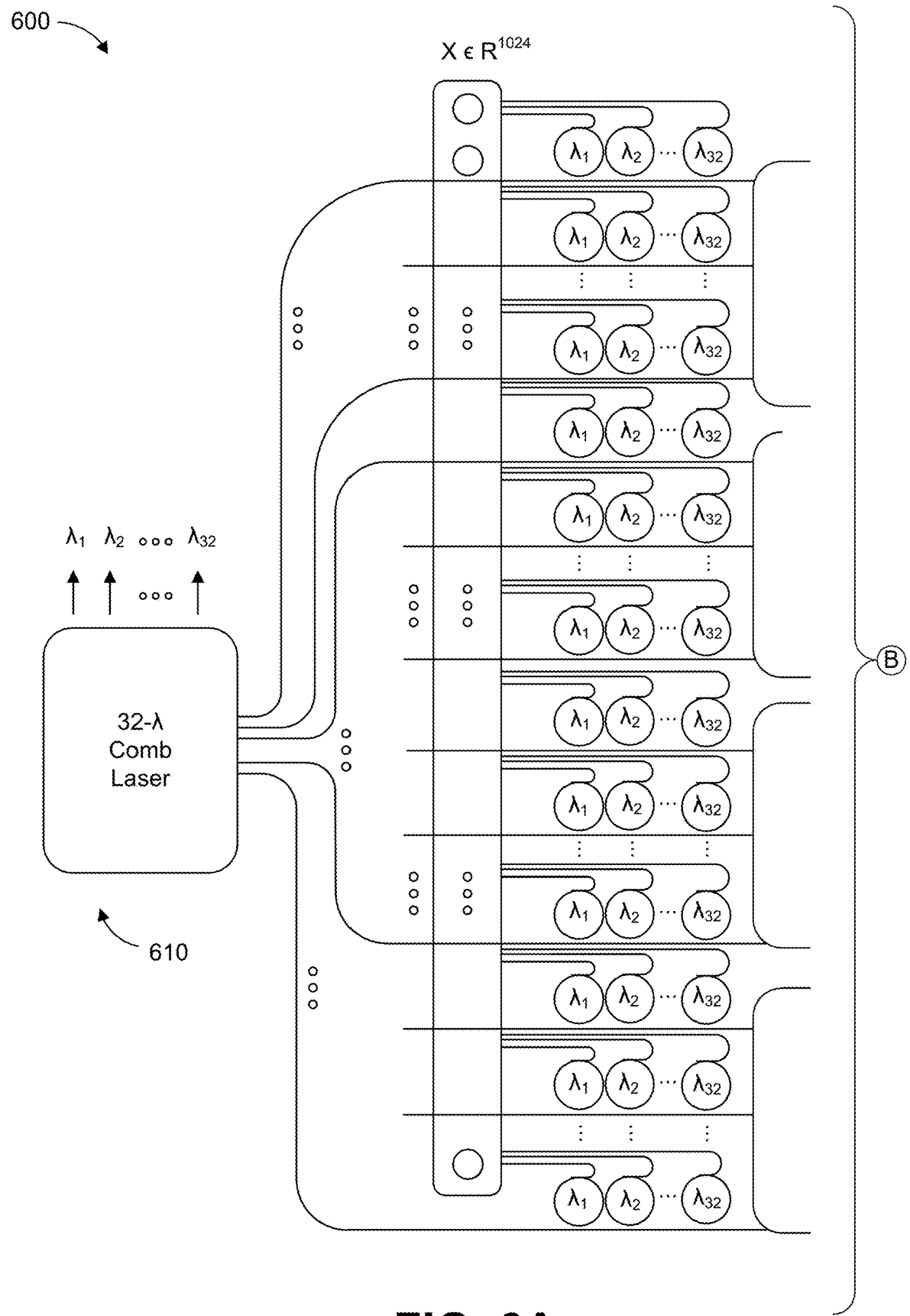
FIGS. 6A-6D depict an example tensorized optical coupling matrix, in accordance with various examples of the presently disclosed technology.
Figure 6B:
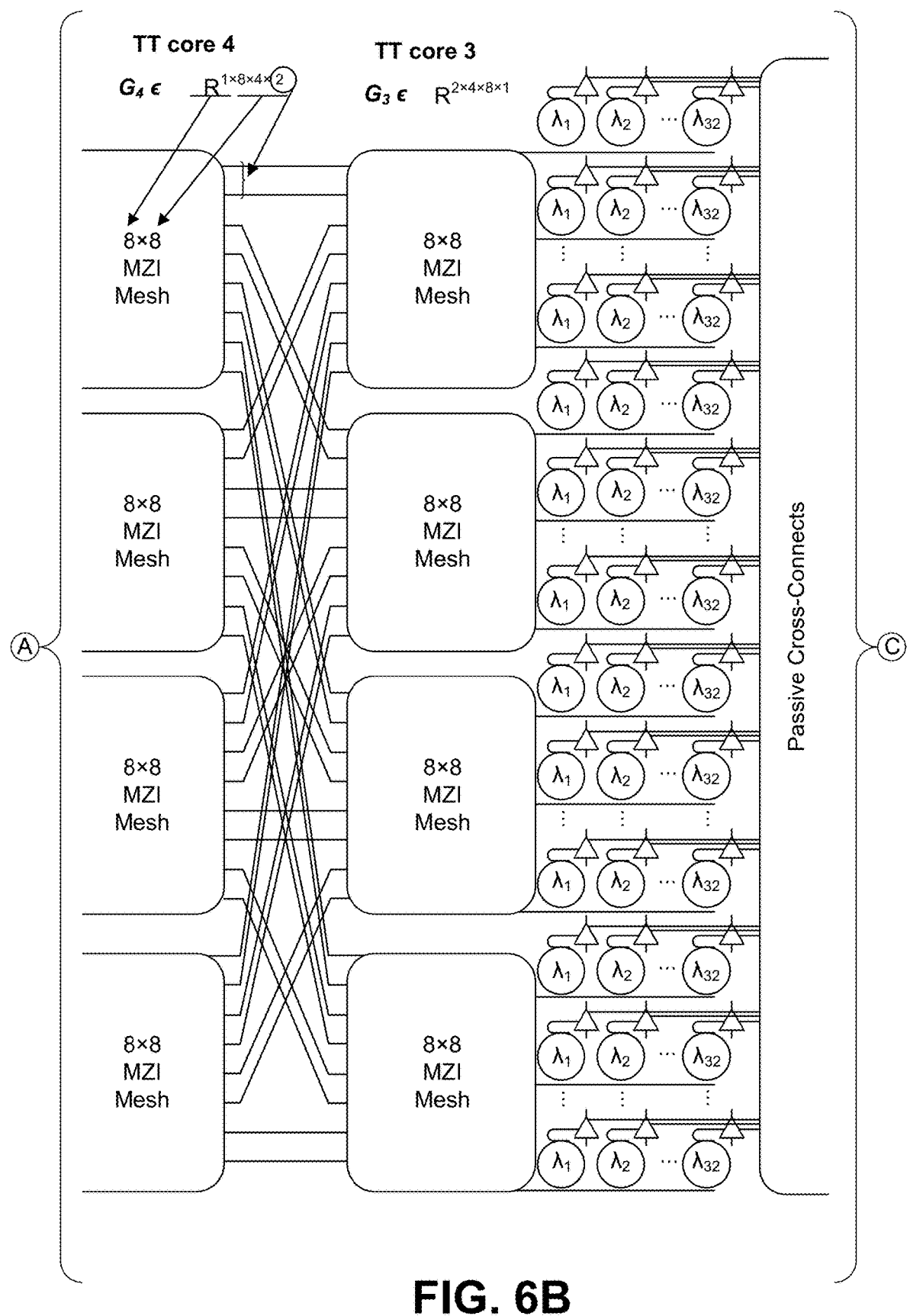
Figure 6C:
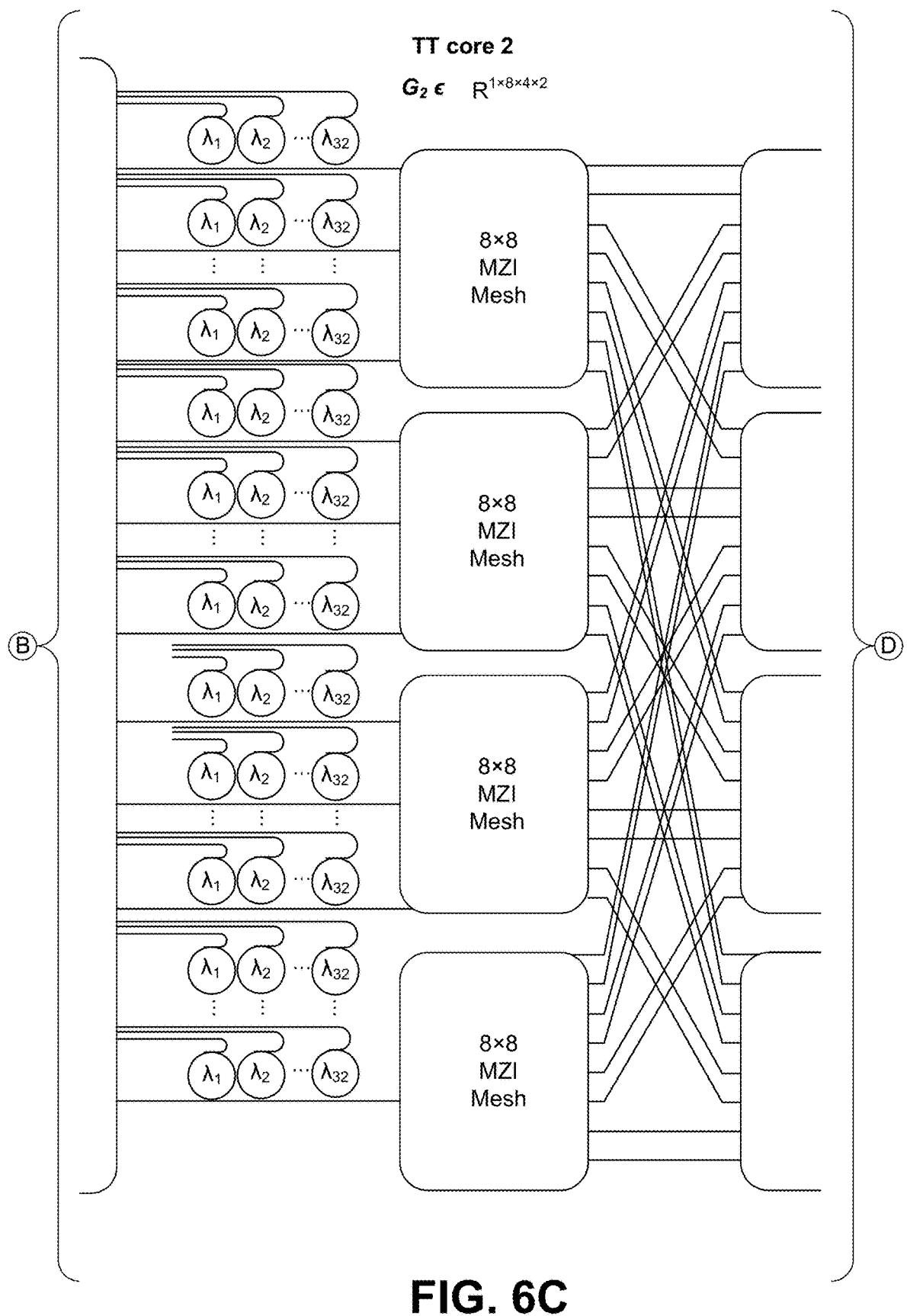
Figure 6D:
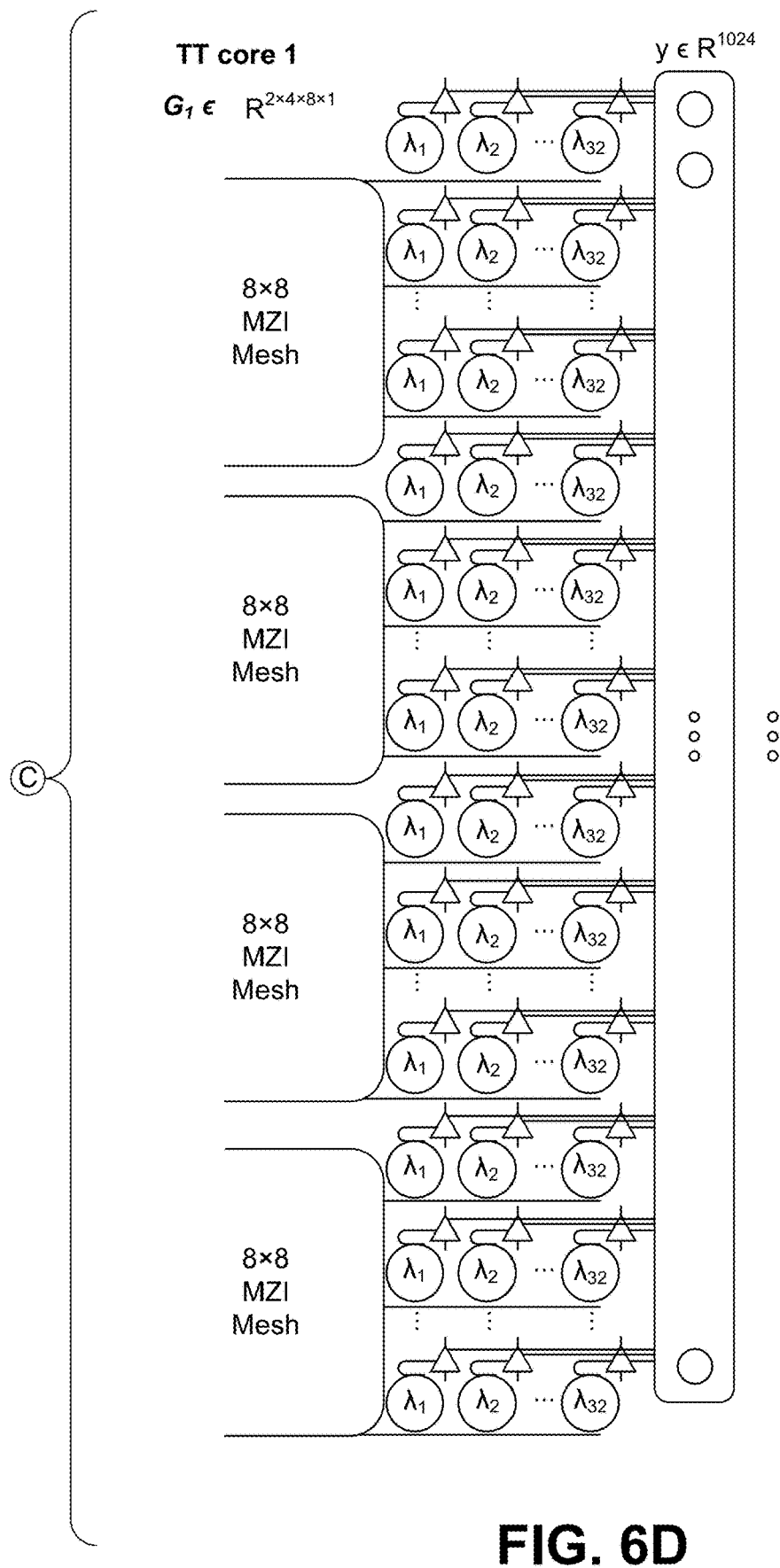

FIG. 5 depicts an example multi-wavelength Ising node collection 500, in accordance with various examples of the presently disclosed technology. Multi-wavelength Ising node collection 500 may be an example of a multi-wavelength Ising node collection of tensorized integrated CIM 300 of FIG. 3.

As depicted, multi-wavelength Ising node collection 500 comprises g bistable Ising nodes implemented on a Mach Zehnder interferometer (MZI), where each bistable Ising node of the multi-wavelength Ising node collection is associated with a separate wavelength of light. A given bistable Ising node may comprise two identical optical resonators configured to modulate light of the given bistable Ising node's associated wavelength. For example, a first bistable Ising node of multi-wavelength Ising node collection 500 may comprise optical resonators 510(1)(a) and 510(1)(b). Optical resonators 510(1)(a) and 510(1)(b) may be configured to modulate light of a first wavelength. Together with a bias pump 530 (which may be a multi-wavelength bias pump associated with g wavelengths), optical resonators 510(1)(a) and 510(1)(b) may also be configured to store two bistable/anti-correlated states. Relatedly, a g-th bistable Ising node of multi-wavelength Ising node collection 500 may comprise optical resonators 510(g) (a) and 510(g) (b). Optical resonators 510(g) (a) and 510(g) (b) may be configured to modulate light of a g-th wavelength. Together with bias pump 530, optical resonators 510(g) (a) and 510(g) (b) may also be configured to store two bistable/anti-correlated states.

As alluded to above (and as depicted), the g bistable Ising nodes of multi-wavelength Ising node collection 500 are implemented on a common MZI.

The MZI on which the g bistable Ising nodes are implemented includes: (a) a first arm waveguide 514; (b) a second arm waveguide 515; (c) an input-side optical coupler 518; and (d) an output-side optical coupler 519. As depicted, input-side optical coupler 518 receives a first input from a tensorized optical coupling matrix-to-multi-wavelength Ising node collection waveguide 520 and a second input from a feedback loop waveguide 516. Input-side optical coupler 518 then outputs a first output to first arm waveguide 514 and a second output to second arm waveguide 515. Output-side optical coupler 519 receives a first input from first arm waveguide 514 and a second input from second arm waveguide 515. Output-side optical coupler 519 then outputs a first output to a multi-wavelength Ising node collection-to-tensorized optical coupling matrix waveguide 522 and a second output to feedback loop waveguide 516. Input-side optical coupler 518 and output-side optical coupler 519 may be various types of optical couplers, including 50-50 splitters, multi-mode interferometers (MMIs), direction couplers, etc.

Through its feedback loop/MZI structure, multi-wavelength Ising node collection 500 can selectively modify the circulating power of symmetric super-modes of the optical resonators implemented on the arms of the MZI such that the optical resonators assume two anti-correlated states. A coupler inside feedback loop waveguide 516 can be used to add bias signals from bias pump 530 (as alluded to above, these bias signals may be associated with the g wavelengths).

In various examples, multi-wavelength Ising node collection 500 may also include bias field couplers (not depicted) implemented on each of tensorized optical coupling matrix-to-multi-wavelength Ising node collection waveguide 520 and multi-wavelength Ising node collection-to-tensorized optical coupling matrix waveguide 522 respectively. Such bias field couplers can inject bias fields for the spin variable and facilitate monitoring of current spin amplitude.

As examples of the presently disclosed technology are designed in appreciation of, asymmetry of the bistability of a single optical resonator can be circumvented by encoding spin states in two optical resonators (e.g., optical resonators 510(1)(a) and 510(1)(b)) configured such that their internal states are anti-correlated. Accordingly, a given bistable Ising node of multi-wavelength Ising node collection 500 can exhibit a pitchfork bifurcation as drive from multi-wavelength bias pump 530 increases power for a bias field above a threshold level. This may be analogous to the bifurcation occurring in a degenerate optical parametric oscillator. In this sense, the given bistable Ising node can emulate certain traditional CIMs based on degenerate optical parametric oscillators (DOPOs) but with an additional advantage that the input field of bias pump 530 is of the same wavelength as the signal field of bias pump 530. Furthermore, the given bistable Ising node does not depend on any specific type of optical nonlinearity and could also be adaptive to devices with nonlinear loss.

As alluded to above, a strong bias field entering a first MZI input (e.g., a first input of input-side optical coupler 518) can lead to tunable, phase-sensitive gain for the transmission of a small signal from a second MZI input (e.g., a second input of input-side optical coupler 518) to a second MZI output (e.g., an output from input-side optical coupler 418). A maximum gain can be determined by detuning of the bias (and signal) drive from a common optical resonator resonance frequency. For example, there may exist a threshold detuning beyond which the optical resonators 510(1)(a) and 510(1)(b) individually become bistable over a certain input power range. To implement two states to encode spin, coherent feedback can be used to couple resonator modes for optical resonators 510(1)(*a*) and 510(1)(*b*). For example, using a first appropriately chosen bias feedback phase (driven by bias pump 530), two metastable states can be made unstable such that optical resonators 510(1)(*a*) and 510(1)(*b*) can only assume anti-correlated internal states. Optical resonators 510(2)(*a*) and 510(2)(*b*) can be configured such that a second bias feedback phase (driven by bias pump 530) causes optical resonators 510(2)(*a*) and 510(2)(*b*) to assume anti-correlated states. Relatedly, optical resonators **510(*g*) (a) and 510(*g*) (b) can be configured such that a third bias feedback phase (driven by bias pump 530) causes optical resonators 510(*g*) (a) and 510(*g*)** (b) to assume anti-correlated states, and so on.

Here it should be understood that multi-wavelength Ising node collection 500 is just one example implementation of a multi-wavelength Ising node collection. For instance, another multi-wavelength Ising node collection implementation may comprise one bus waveguide and multiple microring resonators with internal reflection. Another multi-wavelength Ising node collection implementation may comprise multiple directly-coupled dual microring resonators.

FIGS. 6A-6D depict an example tensorized optical coupling matrix 600, in accordance with various examples of the presently disclosed technology. It should be understood that tensorized optical coupling matrix 600 merely depicts an example, and that other implementations may include tensorized optical coupling matrices of different configurations that embody the same/similar principles.

Namely, examples of the present technology provide "tensorized" integrated CIMs that improve scalability by leveraging a tensorized optical coupling matrix (e.g., tensorized optical coupling matrix 600) comprising layers of multi-wavelength photonic tensor-train (TT) cores (e.g., photonic TT core layer 4, photonic TT core layer 3, photonic TT core layer 2, and photonic TT core layer 1) cascaded together via passive optical cross-connects. A multi-wavelength photonic TT core may comprise a Mach Zehnder interferometer (MZI) mesh (i.e., a lattice/array of interconnected MZIs-see e.g., FIG. 7 for more details) that modulates the phase and/or amplitude of optical signals.

The tensorized optical coupling matrix/cascaded multi-wavelength photonic TT cores can implement a tensor-train (TT) decomposition algorithm that efficiently compresses over-parameterized coupling matrices (especially low-rank sparse coupling matrices) used for solving the Ising model. Furthermore, by cascading the multi-wavelength photonic TT cores via the passive cross-connects, further reductions in hardware (e.g., fewer MZIs) and footprint can be realized. Accordingly, a tensorized integrated CIM of the present technology can be scaled-up to solve complex NP-hard problems with less hardware and a smaller footprint than existing integrated CIMs. Relatedly, the tensorized integrated CIM may be less expensive to fabricate, consume less power, and require less control complexity than existing integrated CIMs.

Figure 9:
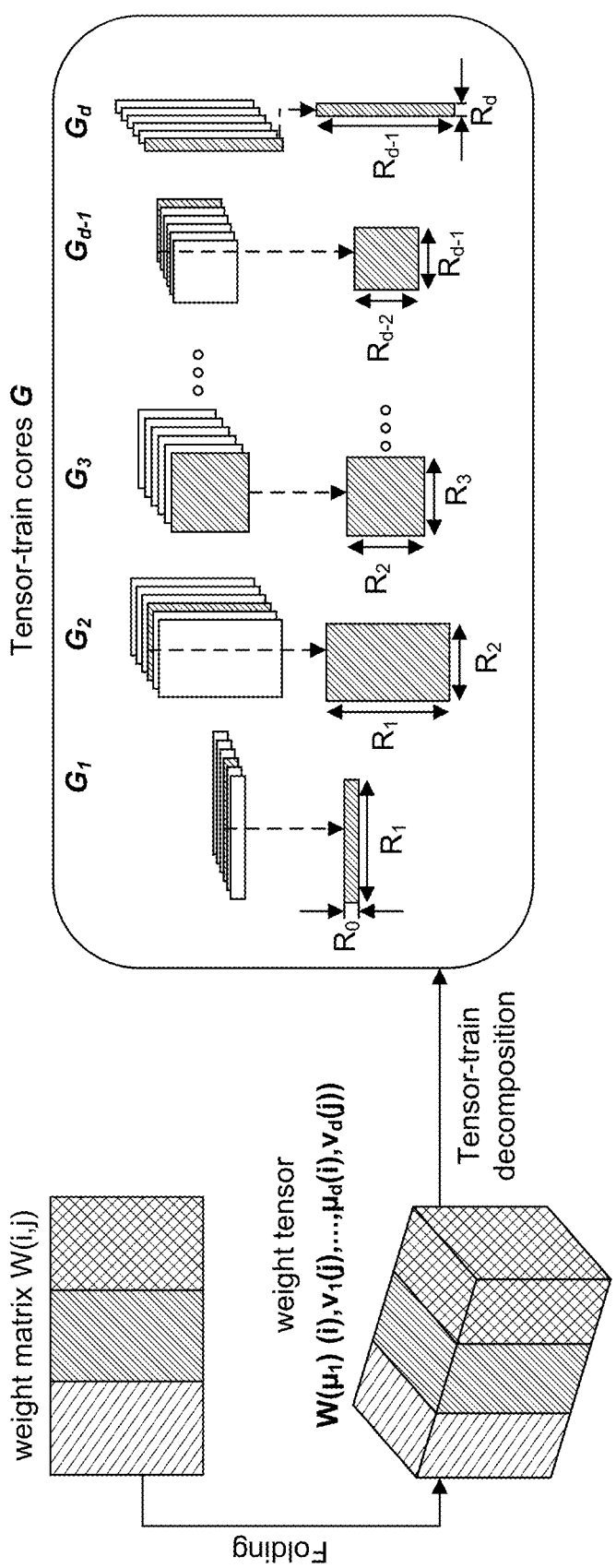
FIG. 9 depicts an example of weight matrix TT decomposition for parameter compression, in accordance with various examples of the presently disclosed technology.

Referring now to the TT decomposition algorithm, as examples of the present technology are designed in appreciation of, a weight matrix $W \in R^{M \times N}$ can be represented in a TT format. The matrix dimensions M and N may be assumed to be factored as $$M = \Pi_{k=1}^{d} M_k \text{ and } N = \Pi_{k=1}^{d} N_k,$$

where d is defined as the number of factors of M and N. μ and ν may be natural bijections from indices (i,j) of W to indices [μ₁(i), ν₁(j) . . . , μ_d(i), ν_d(j)] of a second order-2d weight tensor W. Then, $W(i, j) = W(\mu_1(i), \nu_1(j) \ldots, \mu_d(i), \nu_d(j))$. TT decomposition can be interpreted as singular value decomposition (SVD) of multi-dimensional matrices. As seen in FIG. 9, TT decomposition can express the weight tensor W as a series of tensor products as depicted in Eq. 3 below:

$$W(\mu_1(i), \nu_1(j)\ldots, \mu_d(i), \nu_d(j)) = \prod_{k=1}^{d} G_k(:, \mu_k(i), \nu_k(j), :); \quad \text{(Eq. 3)}$$

Here, a four-way tensor $G_k \in R^{R_{k-1} \times M_k \times N_k \times R_K}$ is the TT-core and the total number of tensor cores is d. The vector $(R_0, R_1, \ldots, R_d)$ is the TT rank, and $R_0 = R_d = 1$. In this way, the total number of parameters can be reduced from M×N into the summation of the parameters of the TT-cores, $$\text{i.e., } \Sigma_{k=1}^{d} R_{k-1} \times M_k \times N_k \times R_k.$$

Referring now to example tensorized optical coupling matrix 600 of FIG. 6, tensorized optical coupling matrix 600 may be configured to receive inputs from 1024 bistable Ising nodes associated with 32 separate wavelengths of light. Here, 1024×1024 is factorized as 8×4×4×8×8×4×4×8. As depicted, the total number of photonic TT core layers is four (i.e., d=4), and the total number of wavelengths is 32 (i.e., g=32). Accordingly, in various examples, multi-wavelength Ising node collections coupled to tensorized optical coupling matrix 600 may each comprise 32 bistable Ising nodes associated with the 32 separate wavelengths.

Here, the TT-rank can be set as $R_0 = R_2 = R_4 = 1$ and $R_1 = R_3 = 2$.

As a result, tensorized optical coupling matrix 600 comprises four photonic TT core layers-photonic TT core layer 4, photonic TT core layer 3, photonic TT core layer 2, and photonic TT core layer 1—with the dimensions of $G_4 \in R^{1 \times 8 \times 4 \times 2}$, $G_3 \in R^{2 \times 4 \times 8 \times 1}$, $G_2 \in R^{1 \times 4 \times 8 \times 2}$ and $G_1 \in R^{2 \times 4 \times 8 \times 1}$ respectively. Passive optical cross-connects between photonic TT core layer 4 and photonic TT core layer 3 can implement index switching between the space domain of the intermediate signals. The passive optical cross-connects between photonic TT core layer 2 and photonic TT core layer 1 can implement similar index switching. As depicted, the passive optical cross-connects between photonic TT core layer 3 and photonic TT core layer 2 may implement a different functionality. In particular, they may comprise wavelength-space cross-connects that effectively switch indices between the space and wavelength domains of the intermediate signals. The wavelength-space cross connects between photonic TT core layer 3 and photonic TT core layer 2 can be realized by using wavelength division multiplexing (WDM) transponders. In some examples, the wavelength-space cross-connects may be implemented using O/E/O conversions and passive electrical cross-connects.

As depicted, each multi-wavelength photonic TT-core of tensorized optical coupling matrix 600 may comprise an 8×8 MZI mesh. Accordingly (and as depicted), tensorized optical coupling matrix 600 comprises sixteen 8×8 MZI meshes, along with passive optical cross-connects between multi-wavelength photonic TT cores (i.e., the 8×8 MZI meshes) of different photonic TT core layers-leading to sixteen 8×8

MZI meshes, 448 MZIs, and 32 cascaded stages of MZIs in total. Input optical signals received by tensorized optical coupling matrix 600 from bistable Ising nodes may first be modulated by using thirty-two 32-wavelength wavelength division multiplexing (WDM) microring modulator arrays. The signals may then be multiplied by a multi-wavelength photonic TT core of each photonic TT-core layer, before tensorized optical coupling matrix 600 outputs the optical signals back to the bistable Ising nodes.

As depicted, a 32-wavelength comb laser can provide a light source for the 32-wavelength optical signals of the system.

Figure 7:
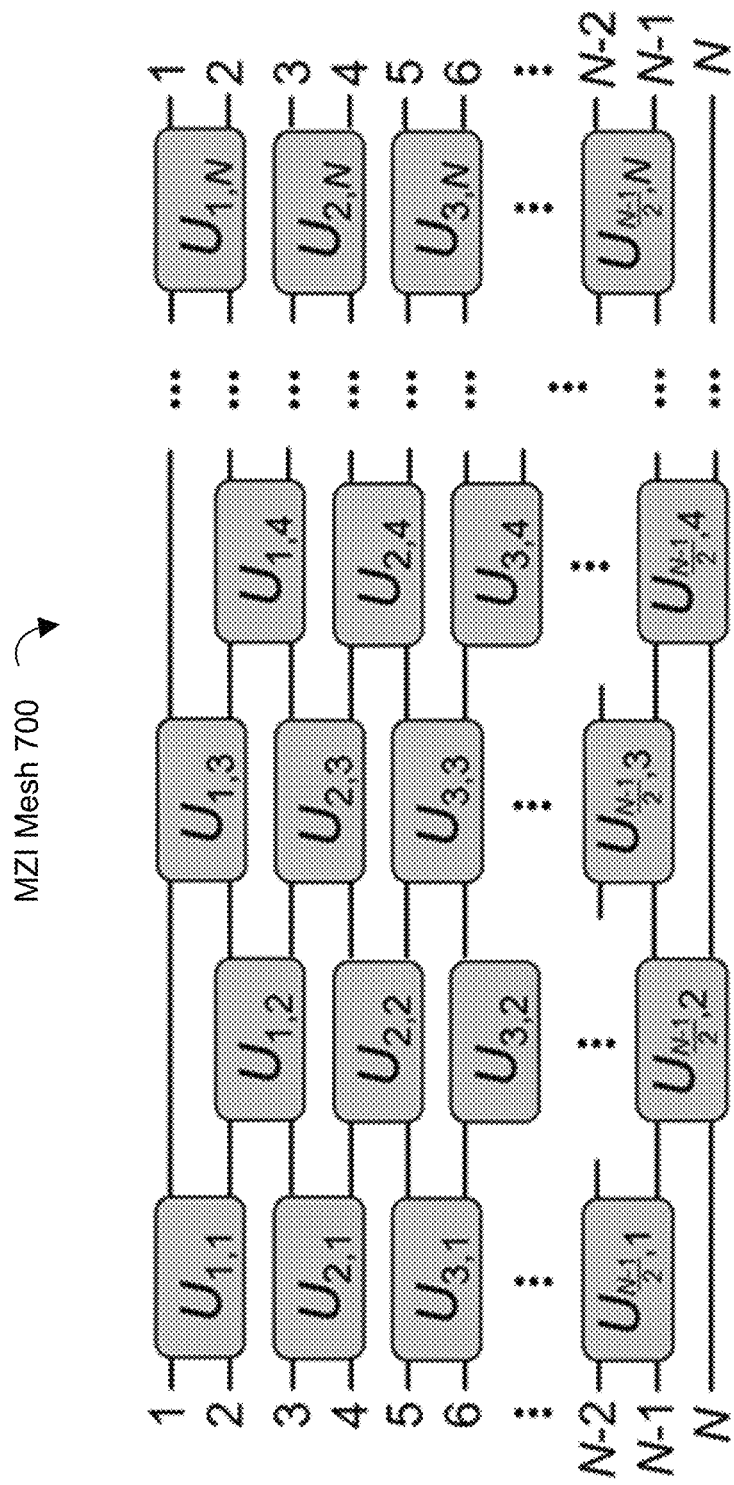
FIG. 7 depicts an example Mach Zehnder interferometer (MZI) mesh, in accordance with various examples of the presently disclosed technology.

FIG. 7 depicts an example Mach Zehnder interferometer (MZI) mesh 700, in accordance with various examples of the presently disclosed technology.

As alluded to above, a multi-wavelength photonic TT core of the presently disclosed technology may comprise an MZI mesh (i.e., a lattice/array of interconnected MZIs). Accordingly, MZI mesh 700 may represent a multi-wavelength photonic TT core of the presently disclosed technology.

As depicted, MZI mesh 700 can implement an N×N unitary matrix represented by a "rectangular" MZI mesh with 2×2 MZIs as the building blocks. That is, each constituent element (e.g., $U_{1,1}$) of MZI mesh 700 may comprise a 2×2 MZI.

Figure 8:
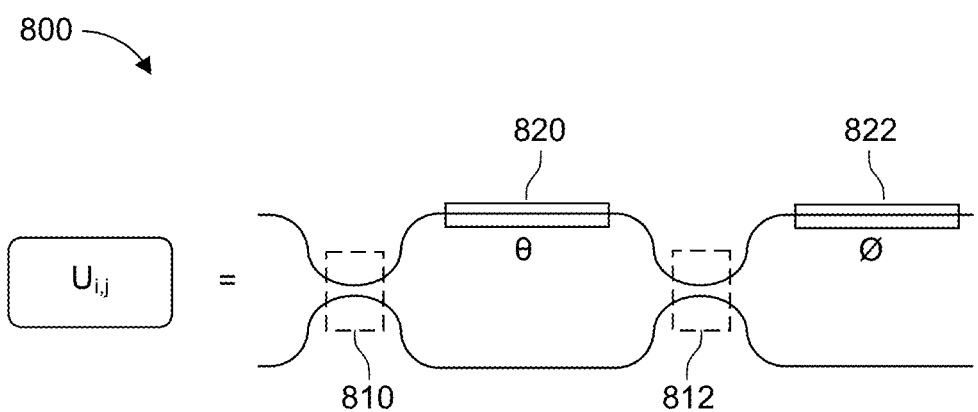
FIG. 8 depicts an example MZI mesh element, in accordance with various examples of the presently disclosed technology.

FIG. 8 depicts an example MZI mesh element 800, in accordance with various examples of the presently disclosed technology. MZI mesh element 800 may comprise one of the constituent MZI mesh elements $U_{i,j}$ of MZI mesh 700.

As depicted, MZI mesh element 800 may comprise a 2×2 MZI. The 2×2 MZI may comprise: (a) a first optical coupler 810 and a second optical coupler 812; and (2) a first phase shifter 820 and a second phase shifter 822. Optical couplers 810 and 812 may be various types of optical couplers, including 50-50 splitters, multi-mode interferometers (MMIs), direction couplers, etc.

As alluded to above, FIG. 9 depicts an example of weight matrix TT decomposition for parameter compression, in accordance with various examples of the presently disclosed technology.

As used herein, the term "optical connection" (and its variants "operatively connected," "operatively connecting," etc.) may refer to a direct or indirect connection between two components that allows an optical signal to pass from one component to another.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. An apparatus comprising:
    a multi-wavelength Ising node collection comprising bistable Ising nodes associated with separate wavelengths of light;
    a tensorized optical coupling matrix;
    a multi-wavelength Ising node collection-to-tensorized optical coupling matrix waveguide optically connecting an output from the multi-wavelength Ising node collection to an input of the tensorized optical coupling matrix; and
    a tensorized optical coupling matrix-to-multi-wavelength Ising node collection waveguide optically connecting an output from the tensorized optical coupling matrix to an input of the multi-wavelength Ising node collection.

2. The apparatus of claim 1, wherein the multi-wavelength Ising node collection-to-tensorized optical coupling matrix waveguide and the tensorized optical coupling matrix-to-multi-wavelength Ising node collection waveguide optically connect the multi-wavelength Ising node collection and the tensorized optical coupling matrix to form an Ising machine feedback loop.

3. The apparatus of claim 1, wherein the bistable Ising nodes are implemented on a Mach Zehnder interferometer (MZI).

4. The apparatus of claim 3, wherein the MZI of the multi-wavelength Ising node collection comprises:
    a first arm waveguide;
    a second arm waveguide;
    an input-side optical coupler that:
        receives a first input from the tensorized optical coupling matrix-to-multi-wavelength Ising node collection waveguide and a second input from a feedback waveguide, and
        outputs a first output to the first arm waveguide and a second output to the second arm waveguide; and
    an output-side optical coupler that:
        receives a first input from the first arm waveguide and a second input from the second arm waveguide, and
        outputs a first output to the multi-wavelength Ising node collection-to-tensorized optical coupling matrix waveguide and a second output to the feedback loop waveguide;
    wherein the bistable Ising nodes of the multi-wavelength Ising node collection are implemented on the MZI between the input-side optical coupler and the output-side optical coupler.

5. The apparatus of claim 4, wherein:
    a first bistable Ising node of the multi-wavelength Ising node collection comprises:
        a first optical resonator optically coupled to the first arm waveguide between the input-side optical coupler and the output-side optical coupler, and
        a second optical resonator optically coupled to the second arm waveguide between the input-side optical coupler and the output-side optical coupler; and
    a second bistable Ising node of the multi-wavelength Ising node collection comprises:
        a third optical resonator coupled to the first arm waveguide between the input-side optical coupler and the output-side optical coupler, and
        a fourth optical resonator coupled to the second arm waveguide between the input-side optical coupler and the output-side optical coupler.

6. The apparatus of claim 5, wherein:
the first and second optical resonators are configured to modulate light of the first bistable Ising nodes' associated wavelength; and
the third and fourth optical resonators are configured to modulate light of the second bistable Ising nodes' associated wavelength.

7. The apparatus of claim 5, further comprising a pump, wherein:
an output of the pump is optically connected to the feedback loop waveguide;
the pump, the first optical resonator, and the second optical resonator are configured to store two anti-correlated states associated with the first bistable Ising node; and
the pump, the third optical resonator, and the fourth optical resonator are configured to store two anti-correlated states associated with the second bistable Ising node.

8. The apparatus of claim 1, wherein the tensorized optical coupling matrix comprises multi-wavelength photonic tensor-train (TT) core layers cascaded together by passive optical cross-connects.

9. The apparatus of claim 8, wherein a multi-wavelength photonic TT core layer of the multi-wavelength photonic TT core layers comprises one or more multi-wavelength photonic TT cores.

10. The apparatus of claim 8, wherein a multi-wavelength photonic TT core of the one or more multi-wavelength photonic TT cores comprises an MZI mesh.

11. An apparatus comprising:
a multi-wavelength Ising node collection comprising bistable Ising nodes implemented on an MZI, wherein the bistable Ising nodes are associated with separate wavelengths of light;
a tensorized optical coupling matrix;
a multi-wavelength Ising node collection-to-tensorized optical coupling matrix waveguide optically connecting an output from the multi-wavelength Ising node collection to an input of the tensorized optical coupling matrix; and
a tensorized optical coupling matrix-to-multi-wavelength Ising node collection waveguide optically connecting an output from the tensorized optical coupling matrix to an input of the multi-wavelength Ising node collection;
wherein the multi-wavelength Ising node collection-to-tensorized optical coupling matrix waveguide and the tensorized optical coupling matrix-to-multi-wavelength Ising node collection waveguide optically connect the multi-wavelength Ising node collection and the tensorized optical coupling matrix to form an Ising machine feedback loop.

12. The apparatus of claim 11, wherein the MZI of the multi-wavelength Ising node collection comprises:
a first arm waveguide;
a second arm waveguide;
an input-side optical coupler that:
receives a first input from the tensorized optical coupling matrix-to-multi-wavelength Ising node collection waveguide and a second input from a feedback waveguide, and
outputs a first output to the first arm waveguide and a second output to the second arm waveguide; and
an output-side optical coupler that:
receives a first input from the first arm waveguide and a second input from the second arm waveguide, and
outputs a first output to the multi-wavelength Ising node collection-to-tensorized optical coupling matrix waveguide and a second output to the feedback loop waveguide;
wherein the bistable Ising nodes of the multi-wavelength Ising node collection are implemented on the MZI between the input-side optical coupler and the output-side optical coupler.

13. The apparatus of claim 12, wherein:
a first bistable Ising node of the multi-wavelength Ising node collection comprises:
a first optical resonator optically coupled to the first arm waveguide between the input-side optical coupler and the output-side optical coupler, and
a second optical resonator optically coupled to the second arm waveguide between the input-side optical coupler and the output-side optical coupler; and
a second bistable Ising node of the multi-wavelength Ising node collection comprises:
a third optical resonator coupled to the first arm waveguide between the input-side optical coupler and the output-side optical coupler, and
a fourth optical resonator coupled to the second arm waveguide between the input-side optical coupler and the output-side optical coupler.

14. The apparatus of claim 13, wherein:
the first and second optical resonators are configured to modulate light of the first bistable Ising nodes' associated wavelength; and
the third and fourth optical resonators are configured to modulate light of the second bistable Ising nodes' associated wavelength.

15. The apparatus of claim 13, further comprising a pump, wherein:
an output of the pump is optically connected the feedback loop waveguide;
the pump, the first optical resonator, and the second optical resonator are configured to store two anti-correlated states associated with the first bistable Ising node; and
the pump, the third optical resonator, and the fourth optical resonator are configured to store two anti-correlated states associated with the second bistable Ising node.

16. The apparatus of claim 11, wherein the tensorized optical coupling matrix comprises multi-wavelength photonic TT core layers cascaded together by passive optical cross-connects.

17. The apparatus of claim 16, wherein a multi-wavelength photonic TT core layer of the multi-wavelength photonic TT core layers comprises one or more multi-wavelength photonic TT cores.

18. The apparatus of claim 16, wherein a multi-wavelength photonic TT core of the one or more multi-wavelength photonic TT cores comprises an MZI mesh.

19. An apparatus comprising:
bistable Ising nodes associated with separate wavelengths of light;
a tensorized optical coupling matrix;
a multiplexer that multiplexes optical signals received from bistable Ising node-to-multiplexer waveguides onto an input waveguide of the tensorized optical coupling matrix;
a demultiplexer that demultiplexes signals received from an output waveguide of the tensorized optical coupling matrix onto demultiplexer-to-bistable Ising node waveguides;

the bistable Ising node-to-multiplexer waveguides optically connecting outputs from the bistable Ising nodes to the multiplexer; and the demultiplexer-to-bistable Ising node waveguides optically connecting outputs from the demultiplexer to the bistable Ising nodes.

20. The apparatus of claim 18, wherein the bistable Ising node-to-multiplexer waveguides and the demultiplexer-to-bistable Ising node waveguides connect the bistable Ising nodes and the tensorized optical coupling matrix to form an Ising machine feedback loop.

* * * * *